(12) United States Patent
Conry

(10) Patent No.: US 9,161,523 B2
(45) Date of Patent: Oct. 20, 2015

(54) FLOATABLE, UNIVERSALLY MOUNTABLE FISHING ROD HOLDER

(71) Applicant: James R. Conry, Willow Springs, IL (US)

(72) Inventor: James R. Conry, Willow Springs, IL (US)

(*) Notice: Subject to any disclaimer, the term of this patent is extended or adjusted under 35 U.S.C. 154(b) by 305 days.

(21) Appl. No.: 13/912,734

(22) Filed: Jun. 7, 2013

(65) Prior Publication Data

US 2014/0215891 A1    Aug. 7, 2014

Related U.S. Application Data

(60) Provisional application No. 61/689,605, filed on Jun. 8, 2012.

(51) Int. Cl.
*A01K 97/10* (2006.01)

(52) U.S. Cl.
CPC .......... *A01K 97/10* (2013.01); *Y10T 29/49826* (2015.01)

(58) Field of Classification Search
USPC ............ 43/21.2; 248/514, 519, 520, 518, 530
See application file for complete search history.

(56) References Cited

U.S. PATENT DOCUMENTS

| | | | |
|---|---|---|---|
| 2,704,412 A * | 3/1955 | Davis | 43/21.2 |
| 3,290,816 A * | 12/1966 | Eklof | 43/21.2 |
| 3,655,155 A * | 4/1972 | Taylor | 248/511 |
| 4,097,017 A | 6/1978 | Hazlitt | |
| 4,112,607 A | 9/1978 | Scher | |
| 4,479,322 A | 10/1984 | Koppel | |
| 4,637,156 A * | 1/1987 | Simmons | 43/21.2 |
| 4,638,593 A | 1/1987 | Garcia | |
| 4,746,253 A * | 5/1988 | Simmons | 43/17 |
| 4,763,435 A | 8/1988 | Deering | |
| 4,803,794 A * | 2/1989 | Lopez | 43/21.2 |
| 5,187,892 A * | 2/1993 | Gutierrez | 43/21.2 |
| 5,269,088 A | 12/1993 | Slaback, Jr. et al. | |
| 5,356,689 A * | 10/1994 | Pechhold | 428/96 |
| 5,402,596 A | 4/1995 | Gillming, Jr. | |
| 5,557,876 A | 9/1996 | Parker | |
| 5,560,137 A * | 10/1996 | Herring | 43/21.2 |
| 5,662,306 A * | 9/1997 | Dysarz | 248/514 |
| 5,697,183 A | 12/1997 | Walker | |
| 5,975,479 A * | 11/1999 | Suter | 248/534 |
| 6,817,136 B2 | 11/2004 | Novak | |
| 6,862,835 B1 | 3/2005 | Connors et al. | |
| 6,898,893 B1 * | 5/2005 | Mukdaprakorn | 43/21.2 |
| 7,434,348 B1 * | 10/2008 | Welch | 43/17 |
| 8,800,196 B2 * | 8/2014 | Baumann | 43/21.2 |
| 2005/0005500 A1 * | 1/2005 | Howley | 43/21.2 |
| 2010/0000144 A1 * | 1/2010 | Yang | 43/21.2 |

FOREIGN PATENT DOCUMENTS

GB    2107161 A   *   4/1983

* cited by examiner

*Primary Examiner* — Christopher P Ellis
(74) *Attorney, Agent, or Firm* — Pyle & Piontek, LLC

(57) ABSTRACT

The floatable, universally mountable fishing rod holder has base incorporating a rod holder for holding the handle of a fishing rod, a floatable portion for floating the fishing rod holder should the fishing rod holder fall into water so it can be recovered, and a plurality of mountings for mounting the fishing rod holder to any of a deck, a dock, a boat, a railing, a post, any of a 2"×4" to 2"×8" lumber, over a T joint formed between two perpendicular rails, railings or posts, whether vertically or horizontally oriented, as well as to ground. Said mountings include one or more clamps, straps, a deck plate and ground engaging stake and fasteners and wing nuts for attachment to the base.

43 Claims, 26 Drawing Sheets

FLOATABLE, UNIVERSALLY MOUNTABLE FISHING ROD HOLDER

DISCLOSURE

This application is a United States Non-Provisional Application claiming the benefit of and the filing date of U.S. Provisional Application Ser. No. 61/689,605, filed on Jun. 8, 2012, of the same title and same inventor, and relates to a fishing rod holder comprising, rod holding means for holding the handle of the fishing rod and a plurality of accessory or mounting means for mounting the fishing rod holder to various objects including, but not limited to, a deck, a dock, a boat, a railing, a post, the ground and various sizes of nominal lumber.

PRIOR ART

Heretofore, many embodiments of fishing rod holders have been proposed. Usually these prior art holders were mountable in one or at best a few ways. However, none have been provided with a body means adapted to accommodate any of a large plurality of mounting means for making the fishing rod holder essentially or generally universally mountable to many structures. Also, it is known that, from time to time, fishing rod holders have fallen into water and disappeared beneath the surface due to their weight and that they were not floatable.

SUMMARY OF THE INVENTION

The present invention is a floatable, generally universally mountable fishing rod holder comprising, rod holding means for holding the handle of a fishing rod, floatable means for floating the fishing rod holder, and a plurality of accessory or mounting means for mounting the fishing rod holder to any of decks, docks, railings, posts, any of a 2"×4" to an 2"×8" (nominal lumber size), over a "T" joint formed between two perpendicular railings, whether vertically or horizontally oriented, as well as to ground. More specifically, the fishing holder incorporates a sufficient amount of flotation such that, should the fishing rod holder fall into water even with one of the mounting means (including the heaviest), it will float and can be retrieved and recovered. The invention provides for easy on and off attachment, and when adjusted to the correct size will not come off unless taken off by user.

According to the invention there is provided a floatable, generally universally mountable fishing rod holder comprising base means or base incorporating the rod holding means for holding the handle of a fishing rod. The base means has floatable means for floating the fishing rod holder should the fishing rod holder fall into water. Thus it can be retrieved and recovered, should the fishing rod holder fall into a body of water. The base means is used with a plurality of mounting means for mounting the fishing rod holder to any of, for example, a deck, a dock, a board or plank, spaced apart board or planks, a boat, a railing, a post, any lumber of for example a normal size of a 2"×4" to an 2"×8", over a "T" joint formed between perpendicular rails, railings, or posts, whether vertically or horizontally oriented, as well as to ground. The mounting means can be one or more clamps on the rod holder, say for instance at the front or rear of the base means, a deck plate to which the base means can be mounted, a ground stake to hold the base means secured and above the ground, ties or straps, Velcroed™ (hook/loop) and buckled, including fasteners to mount to the above mentioned structures. The holder and mounting means may be made of one or more non corroding materials, such as aluminum, stainless steel, brass, plastic or wood, and may be used with standard size (to keep costs down), fastener made preferably of non rusting brass, stainless steel or nylon, such as fasteners such as nuts, bolts screws and rivets. The floatable material can be foam, an air chamber, or even wood, and is preferably closed cell foam. The holder and many mounting means may be formed or bent from sheet material, preferably aluminum of say from ⅛ inch to 12 gauges thick. Preferably, the rod holder portion is made of plastic, such as PVC pipe, so as to minimize possible damage to the fishing rod handle. To minimize turning of the fasteners, the fasteners may be carriage bolts that fit into slots to permit adjustment formed in the base means or other mounting means or square holes, but yet prevent the bolt from turning. Wing nuts may, preferably, be used on the bolts to eliminate the need for tools to affix or remove a mounting means and to make adjustments. The rod holder base has a plurality of strap slots therein to accommodate placement of one or more straps. A safety lanyard can be provided to attach the rod holder or base means to the structure it is mounted to or on. Should the rod holder and even the heaviest use of the accessories (mounting means) fall accidentally into the water, both will float and can be picked up, or if moved off, the fisherman by casting can retrieve and recover the rod holder.

In use the rod holder is mounted to the structure with one of the various accessory mounting means, and then the fishing rod placed in the rod holder. Once the rod holder is installed under normal use, it will stay attached to the structure and can be removed only by reversing the manner in which it was installed. The rod holder may instead be used in one location in one configuration, and then removed and secured in another in the same or different location in the same or different configuration.

DESCRIPTION OF THE PREFERRED EMBODIMENT(S)

Figure 1:
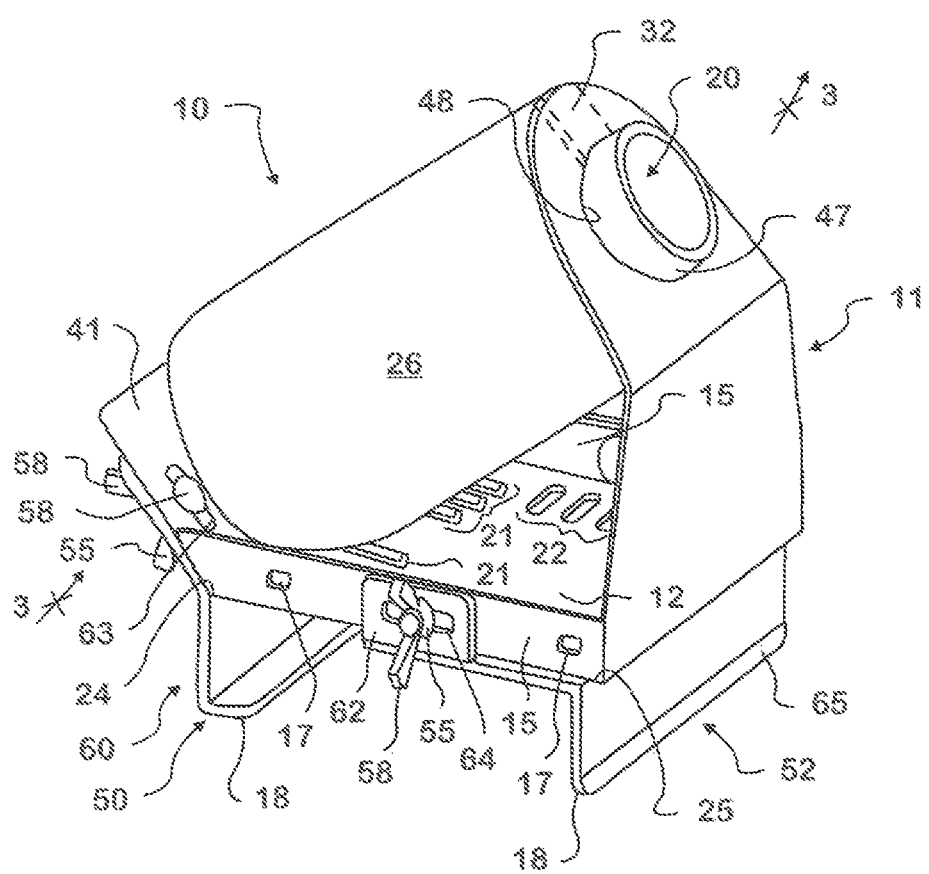
FIG. 1 is a perspective view of a first embodiment of a fishing rod holder of the present invention.
Figure 4:
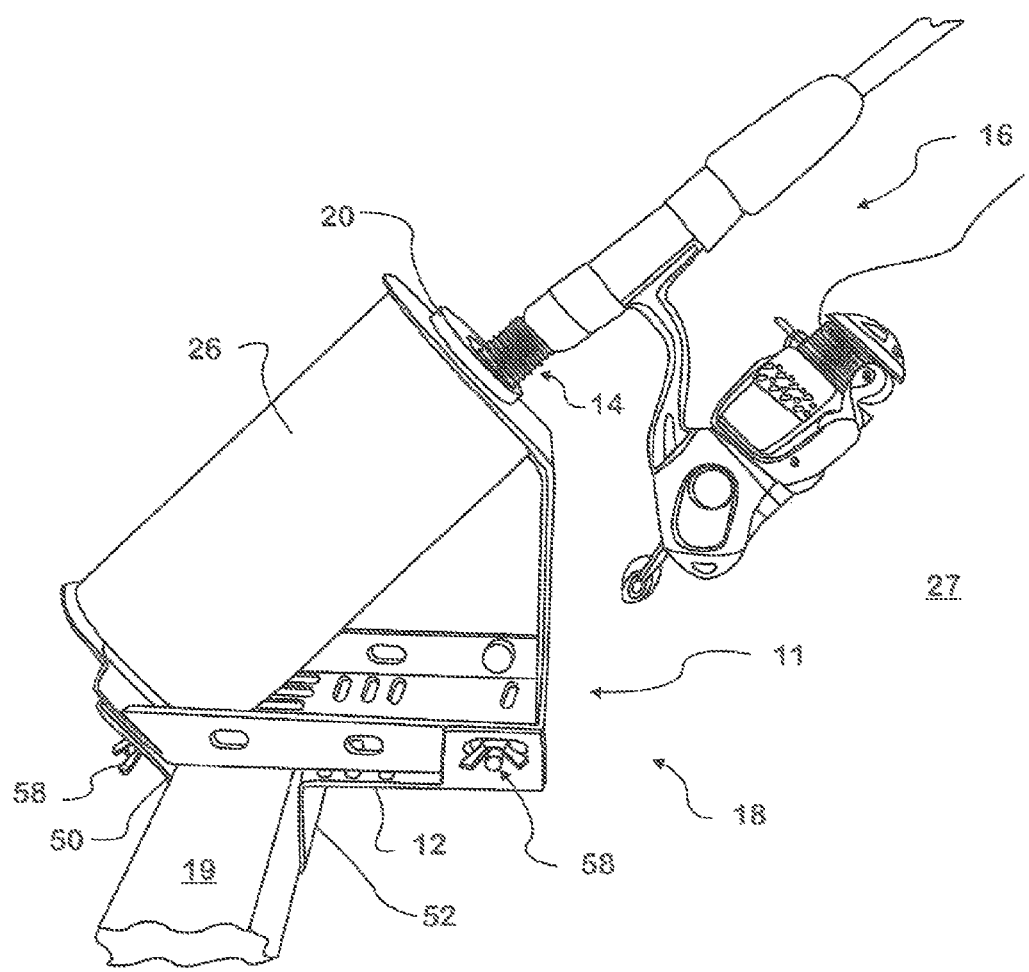
FIG. 4 is a perspective view of the fishing rod holder of FIG. 1 shown holding a fishing rod and attached to a horizontal, substantially square rail by front and rear clamps.

Referring now to the drawings in greater detail, there is illustrated therein a floatable, generally universally mountable fishing rod holder of the present invention, identified by the reference numeral 10. Beginning with a description of the basic fishing rod holder 10, FIG. 1 shows the cut and bent structure of fishing rod holder 10 to comprise a main body or base 11 including a planar base 12 from side edges of which substantially mirror image side flanges 15 extend upwardly, when viewing the holder 10 in its horizontal position (FIG. 1). A plurality of spaced apart openings 17 are provided in each side flange 15, which openings 17 in the first side flange 15 are aligned relative to corresponding openings 17 in the opposite side flange 15. Mounting means 18 which cooperate with the body 11 for mounting the fishing rod holder 10 to nearly any available, suitable supporting structure 19 such as a deck, a dock, spaced apart planks, a boat, a railing, a post, any section of lumber 24 of a minimum 2"×4" to an 2"×8" configuration, whether oriented vertically or horizontally, or even to the ground, if no other supporting structure is available, are further provided. Rod holding means 20 for holding the handle 14 of a fishing rod 16 are also provided (FIG. 4).

The planar base 12 is also seen to incorporate a plurality of paired, mirror image openings 21, 22, 23, grouped or individual, which pairs mirror one another relative to a centerline extending from a first end 24 to a second end 25 of the planar base 12.

Figure 21:
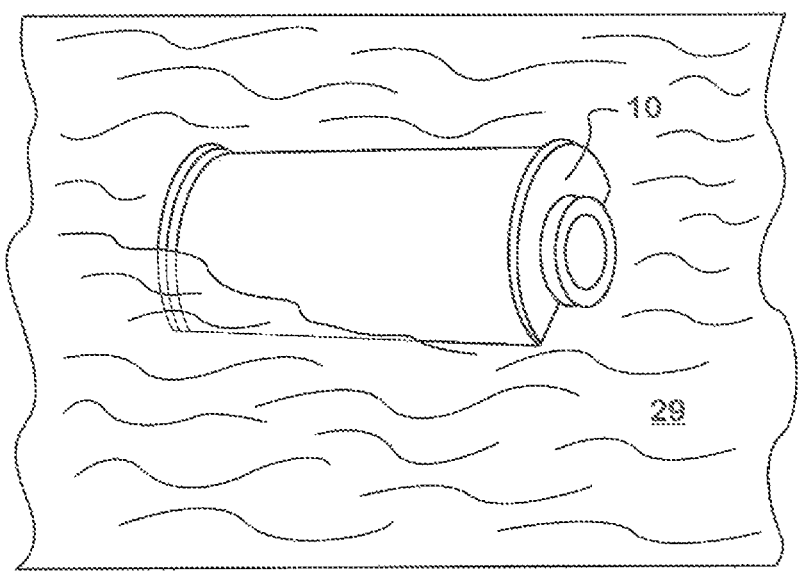
FIG. 21 is perspective view showing the fishing rod holder floating in water, the floatation of the same being sufficient also to float the heaviest and/or largest of any one of the attachment means.

The fishing rod holding means 20, in the preferred embodiment, comprise a hollow cylindrical tube or sleeve 20, preferably made of plastic or PVC pipe of a sufficient inside diameter (say, from about 1½ to 2 inches, with a length of about 7 inches plus or minus 2 inches being preferred) to accept at least the handle 14 (FIG. 4) of the fishing rod 16 therein. Around the rod holder 20, floatable means 26, for floating the fishing rod holder 10 in water 29 (FIG. 21), are provided, should the fishing rod holder 10 end up in a body of water 29. Therefore it should be understood that the floatable means 26 are provided in sufficient amount to float the weight (say, from at least 1 pound to about 3 pounds, with about 2 pounds plus or minus ½ pound being preferred) of the fishing rod holder 10 and also the largest and heaviest accessory or mounting means 18. The holder 10, in the preferred embodiment, is also recoverable through one of by casting a hook on the line of a fishing rod, or by the provision of at least one of various retrieval means 32 provided on the fishing rod holder 10, perhaps on an upper edge area of the holder 10 when viewed as in FIG. 1. The retrieval means 32 could also include a magnetically attractable material item, such as a ferrous member or magnet and can be recovered by another magnetically attractable material item, such as a magnet or ferrous member (not shown) attached to the fishing line of the fishing rod.

The mounting means 18 for the fishing rod holder 10 are preferably constructed of one or more non rusting or limited rusting materials, such as metal, aluminum, steel, stainless steel, galvanized steel, brass, plastic, and wood, nylon, elastic, etc., although this should not be construed as limiting. The mounting means 18 further includes one or more of, and preferably four or more of: a first or rear clamp portion 50, a second or front clamp portion 52, at least a first strap 53, and a second strap 54, a third strap 55, etc. (FIGS. 17-19), a singular rail bracket "T" clamp 56 (FIGS. 14-16), a ground stake 57 (FIGS. 12 and 13), an inverted "T"-shaped bolt 100 (FIGS. 6 to 9), and/or an "L"-shaped bolt 102 in the holder 10, a deck plate 130 (FIGS. 10 and 11) attached thereto, for use of any of the above-identified in mounting the fishing rod holder 10 to available supporting structures 19, as an example. As a safety factor, the mounting means 18 may also include a safety lanyard or cord 30 (FIG. 20) which could be secured to or around the support structure.

Figure 2:
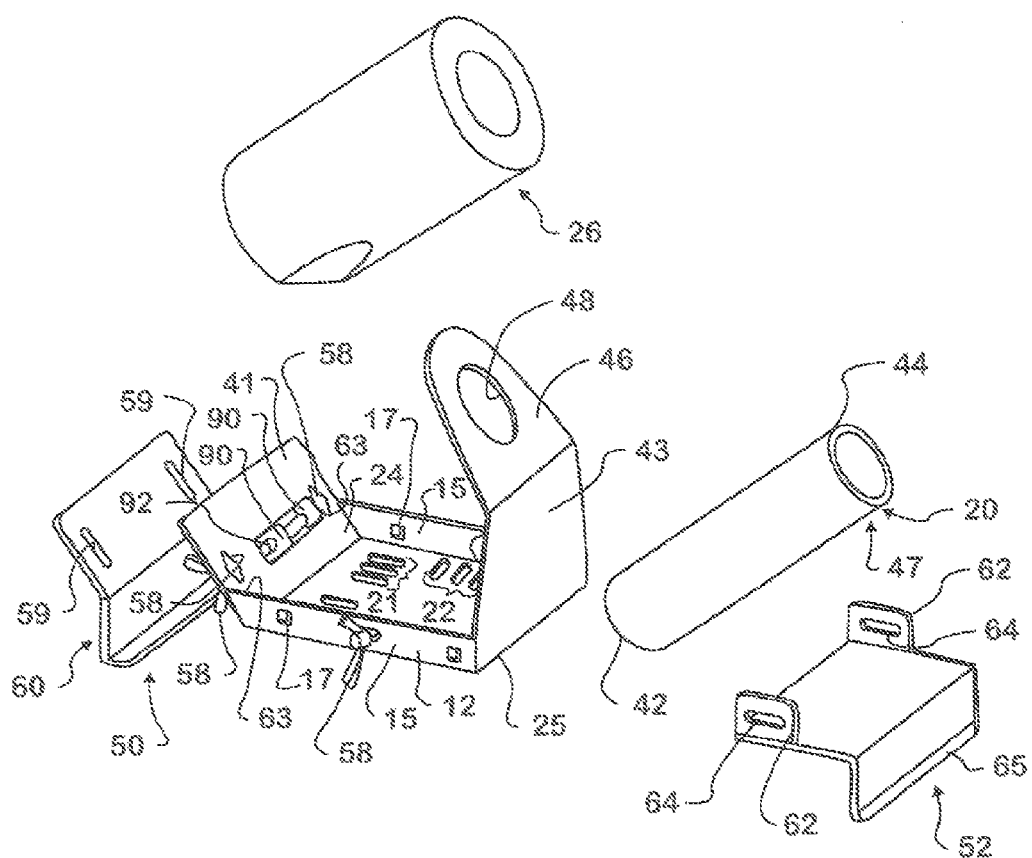
FIG. 2 is a perspective, exploded view of the fishing rod holder shown in FIG. 1.

The floatable means 26 comprise, in this instance, a sleeve made of one or more of floatable materials, such as, for example, foam, preferably closed cell foam, air chamber, plastic, or wood, the floatable sleeve being sized and configured to fit around the rod holding sleeve or tube 20, and being somewhat, say ¼ to 1 inch, longitudinally shorter than rod holding sleeve 20. Preferably, the floatable means 26 is formed from a sheet of floatable material, such as foam pipe insulation for example, which fits around the sleeve or pipe 20 and is engaged about the sleeve 20 by suitable means, such as by adhesive and/or glue. The floatable sleeve 26 may further include an angularly sliced off cutout area 27 to accommodate placement of one end thereof, toward the first end 24 and against the base 12 of the body 11, as best shown in FIGS. 1 and 2. As noted above, the sleeve of floatable material is large enough (in volume, thickness and length) to provide the desired buoyance.

Figure 22:
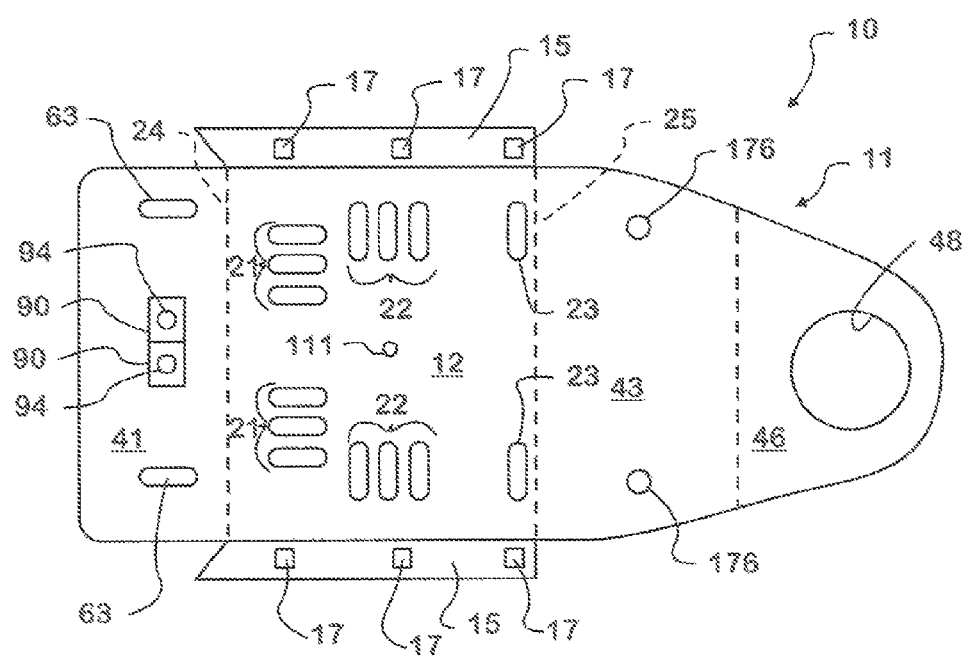
FIG. 22 is a plan view of a blank used to form the base of the fishing rod holder shown in FIG. 1, with folds or bends being made along the dotted lines.

Defining the fishing rod holder 10 in greater detail, it is seen that the body 11 is made of a flat sheet or plate material, which may be preferably stamped out or cut (see blank in FIG. 22) and then folded or bent to desired shape, as illustrated, in the embodiment of FIG. 4. The body 11 not only includes side flanges 15 but also includes a first shorter (at front) upstanding, outwardly angled end flange 41 to which a base end 42 of the fishing rod mounting means 20 is suitably engaged. The body 11 also includes an opposite, (at rear) second taller upstanding outwardly angled end flange 43 having an inwardly angled terminal portion 46 to which an opposite, rod receiving end 44 of the fishing rod mounting means 20 is suitably engaged. This portion gives the desired angle to retain the fishing rod in place, generally by gravity. This angle is say from 30° to about 60°, with about 45° being desired. A portion 47 of the fishing rod mounting means 20 extends outwardly of the shorter, outer floatable sleeve material and through an opening 48 in the terminal portion 46 of the second taller end flange 43. The body 11 cooperates with at least one or both clamp members 50, 52, the rear clamp member 50 being adjustably, removably mountable to cooperating end flange 41, and a front clamp member 52 being adjustably, removably mountable to the body 11 via the cooperating openings 17 in the side flanges 15.

Figure 25:
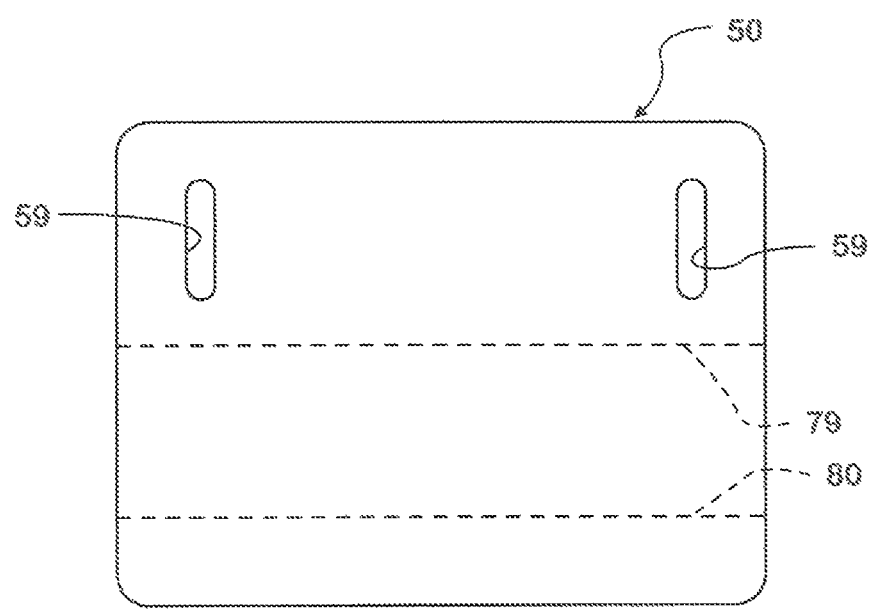
FIG. 25 is a plan view of a blank used to form the first or rear clamp attached to the bottom of the base of the fishing rod holder shown in FIG. 1, with folds or bends being made along the dotted.
Figure 26:
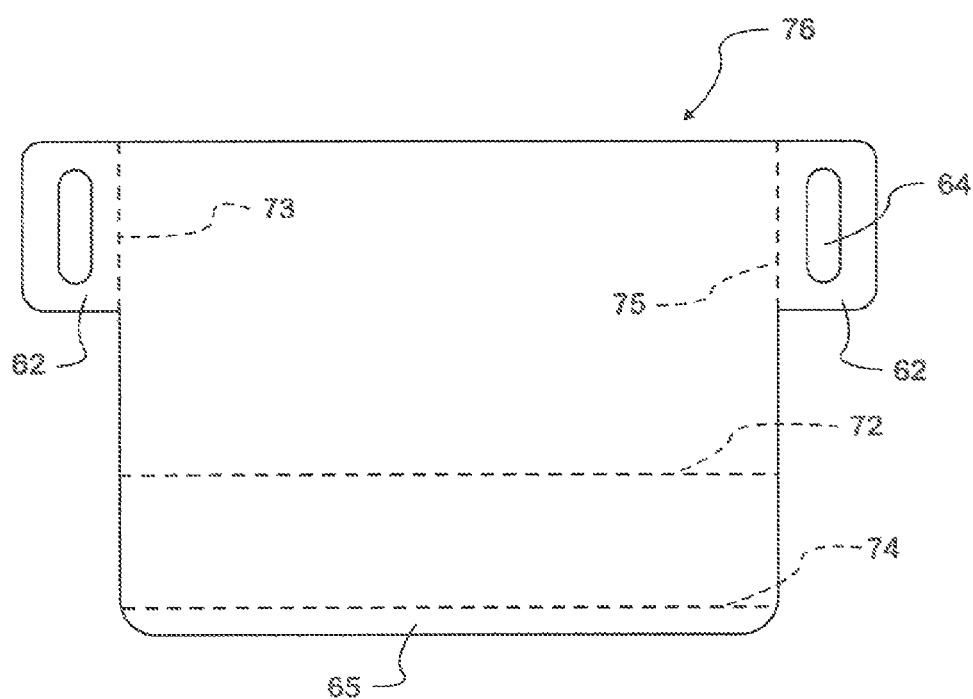
FIG. 26 is a plan view of a blank used to form a first embodiment of a second or front clamp member attached to the bottom of the base of the fishing rod holder shown in FIG. 1, with folds or bends being made along the dotted lines, and with a free end thereof including an outwardly flared flange.
Figure 27:
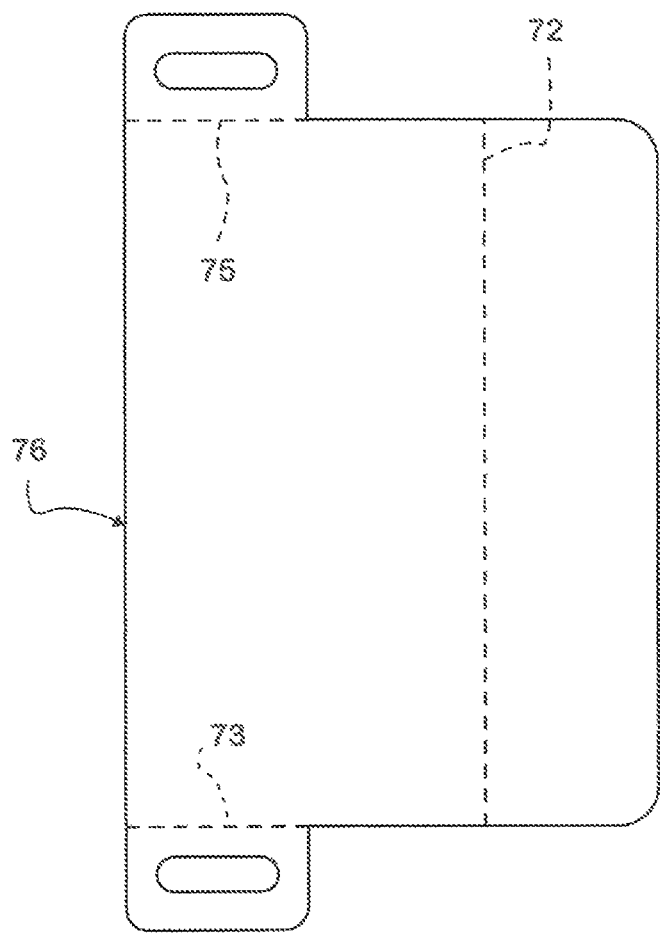
FIG. 27 is a plan view of a blank used to form a second embodiment of a second or front clamp member attached to the bottom of the base of the fishing rod holder shown in FIG. 1, with folds or bends being made along the dotted lines, being without the outwardly flared flange.

The rear and front clamp members 50, 52, respectively, are also preferably formed from flat plate material and are folded and bent to the desired configuration, in a preferred embodiment, as illustrated in FIGS. 25-27, respectively. The clamp members 50, 52 may be engaged to the body 11, by any suitable connector 58, fitting in slots or square holes, preferably such as by paired wing nuts and carriage bolts 58 (to eliminate the need for a tool) fitting in the slots to prevent bolt rotation.

In this respect, the end flange 41 includes a pair of slot openings 63 in a top or upper section 61 thereof which align with elongate slot openings 59 in the first or rear clamp member 50 (shown as a blank 50 in FIG. 25) so that a connector 58 can extend through these aligned openings to join the rear clamp member 50 to the end flange 41, with the vertical position of the depending portion 60 of the first clamp member being adjustable. The adjustability is provided by the elongate slot openings 59 in the first clamp member, the position of the extending portion 60 depending on the position within the elongate slot 59 that the connector 58 is secured. The extending portion 60 comprises an "L"-shaped bracket 60 which cooperates with the configuration of the second or front clamp member 52, to secure the holder 10 to a supporting structure 19. The extending portion 60, when viewed as in FIG. 1, is vertically oriented while the upper section 61 is slanted upwardly and outwardly to accommodate abutment against the end flange 41 of the holder 10, when bent or folded along dotted lines 79 and 80, respectively, as shown in FIG. 25.

Figure 5:
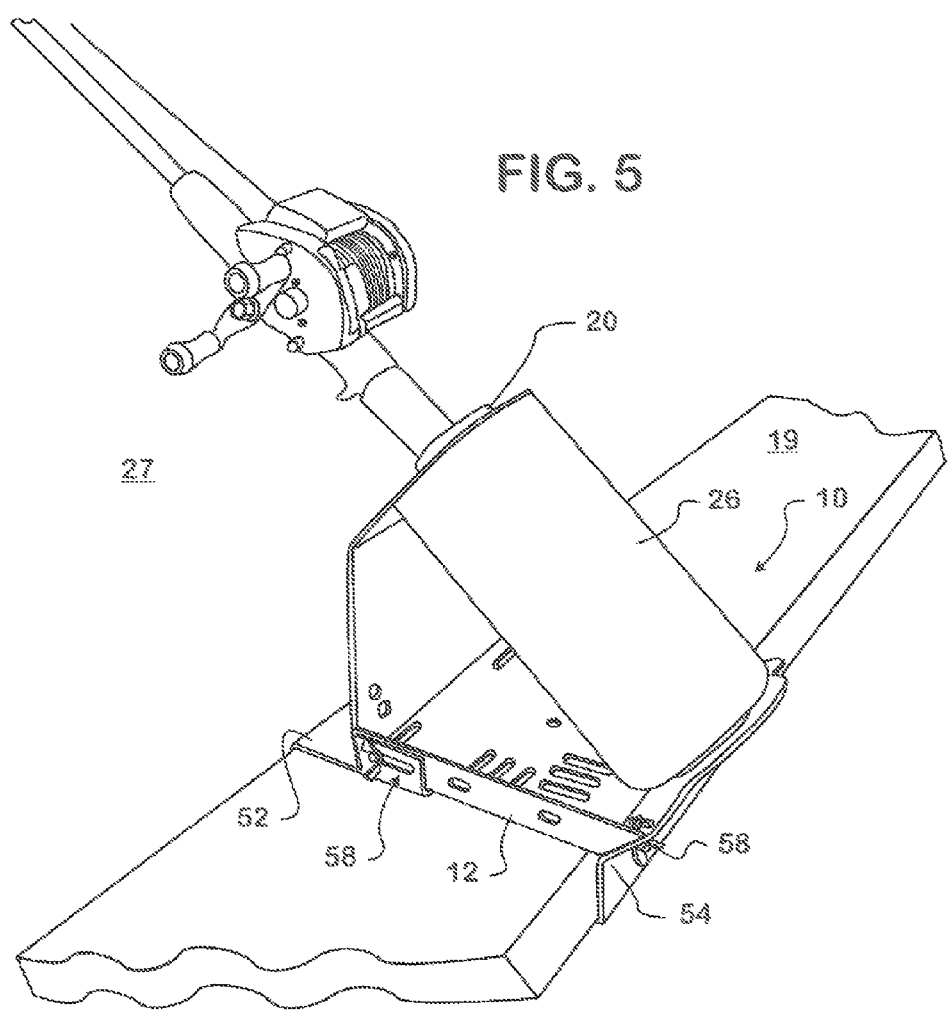
FIG. 5 is a perspective view of the fishing rod holder of FIG. 1 shown holding a fishing rod and attached to a horizontal rail such as a nominal 2"×4", 2"×6", 2"×8", etc. lumber.

Looking now at the second or front clamp member 52, it is shown in its blank 76, 76' form in FIG. 26 or 27, respectively, to comprise an "L"-shaped member when bent or folded along dotted lines 72, 73, 74 and 75 into the configuration shown in FIG. 2. The clamp 52 has perpendicular or upstanding side portions 62 which incorporate elongate slot openings 64, which are configured to cooperate with openings 17 in the side flanges 15 for adjustably securing the second clamp member 52 to the side flanges 15 with other suitable connectors 58, such as carriage bolts 58. A free end of the second or front clamp member 52 may (FIG. 26) or may not (FIG. 27) include a slightly outwardly flared portion or flare 65 to assist in positioning the cooperating clamp members 50, 52 to a suitable supporting structure 19, such as deck or dock railing 19, depending on which configuration of blank 76 or 76' is utilized. The second clamp member 52 is created in its first form from the blank 76 shown in FIG. 26 and is folded along lines 72-74, and flared outwardly beyond line 74, into the final desired shape thereof as best shown in FIG. 2. The second clamp member 52 may also be created in a second form from the blank 76' shown in FIG. 27, if no flared end 65 is desired. It will be understood that the clamp member 52 may be positioned as shown in FIG. 4 to underlie the base 12, or may extend outwardly of the base 12, as shown in FIG. 5 to accommodate wider widths of a supporting surface 19.

Figure 3:
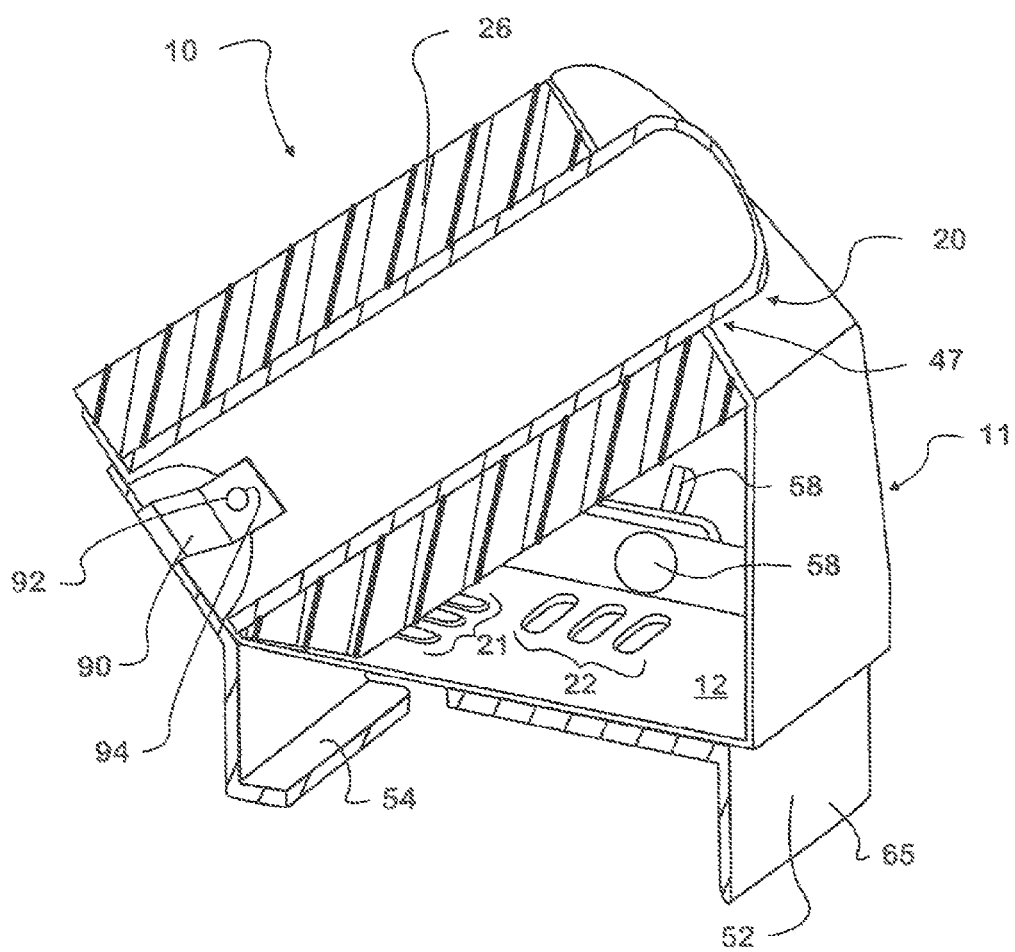
FIG. 3 is a perspective cross-sectional view taken on the line 3-3 of FIG. 1.

Turning to FIGS. 2 and 3, there is also shown an anchoring means for engaging the sleeve 20 to end 41 of the base 12. Here the base end 41 is shown to incorporate two inwardly folding flanges 90 which cooperate to accept a fixation device 92, such as a rivet, pop rivet, cotter pin or bolt 92 within aligned openings 94 therein when folded 90° inwardly. The fixation device also engages within aligned circumferential openings or ports 96 in one side of the sleeve 20, and then continues through the openings 94 and out the other port 96 in the other side, fixing the sleeve 20 to the flanges 90 at one end or bottom of the sleeve 20.

Figure 6:
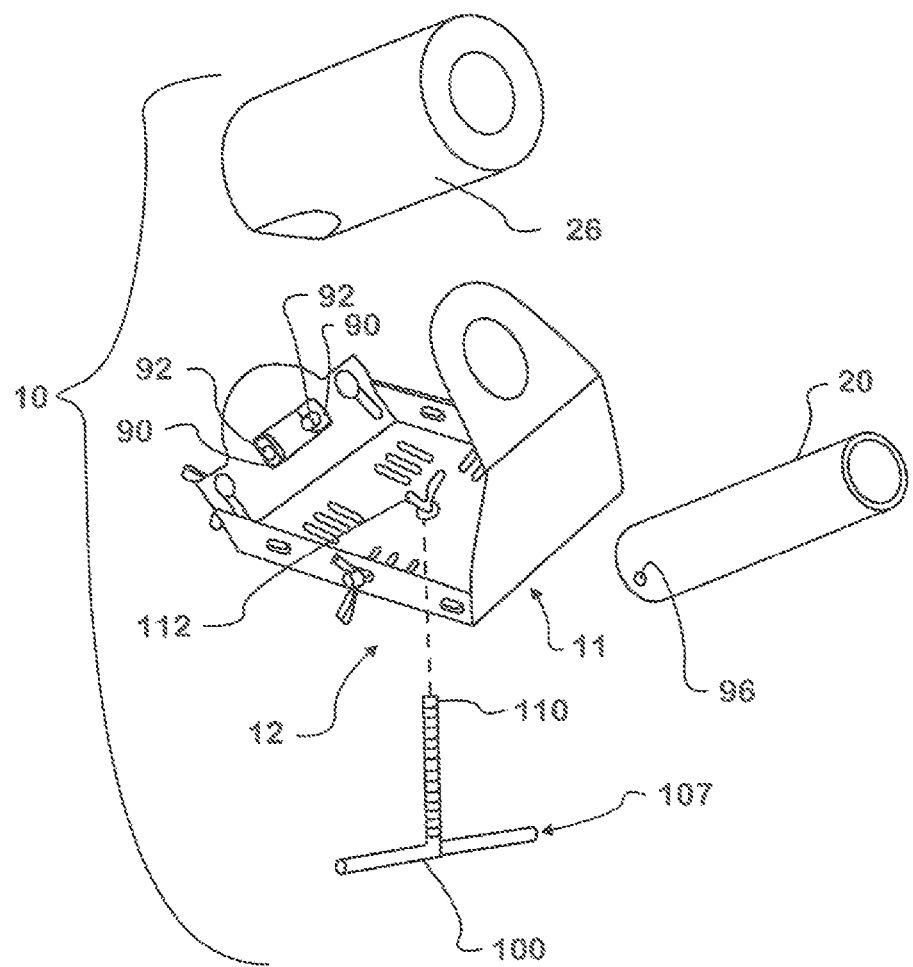
FIG. 6 is an exploded perspective view of the embodiment of the fishing rod holder of the present invention, showing another accessory attachment means which comprises an inverted "T"-shaped threaded bolt which is attached to the base by a wing nut and which secures the fishing rod holder to a supporting surface (such as dock or deck planks having a space there between) into which the "T"-shaped bolt may be inserted and then turned so as to engage an undersurface of the supporting surface (planks) when tightened thereagainst by use of the wing nut.

Turning now to FIG. 6, the mounting means 18 here is shown to comprise an inverted "T"-shaped bolt 100 which extends downwardly from the base 12, into an opening 104 between supporting surface 19 structures, such as those formed between gapped or spaced apart planks or boards 106 (FIGS. 8 and 9), for example, with the "T" formation 107 of the bolt 100 then being turned after being passed through the gap or opening 104 to engage against undersurfaces (not shown) of adjacent boards 106, with the bolt 100 being drawn tight and maintained in position thereagainst by the application of pressure on a threaded end 110 thereof which extends through any suitable opening in the base 12, such as opening 111, by means of attachment of a nut 112, preferably a wing nut 112, over the threaded end 110.

Figure 7:
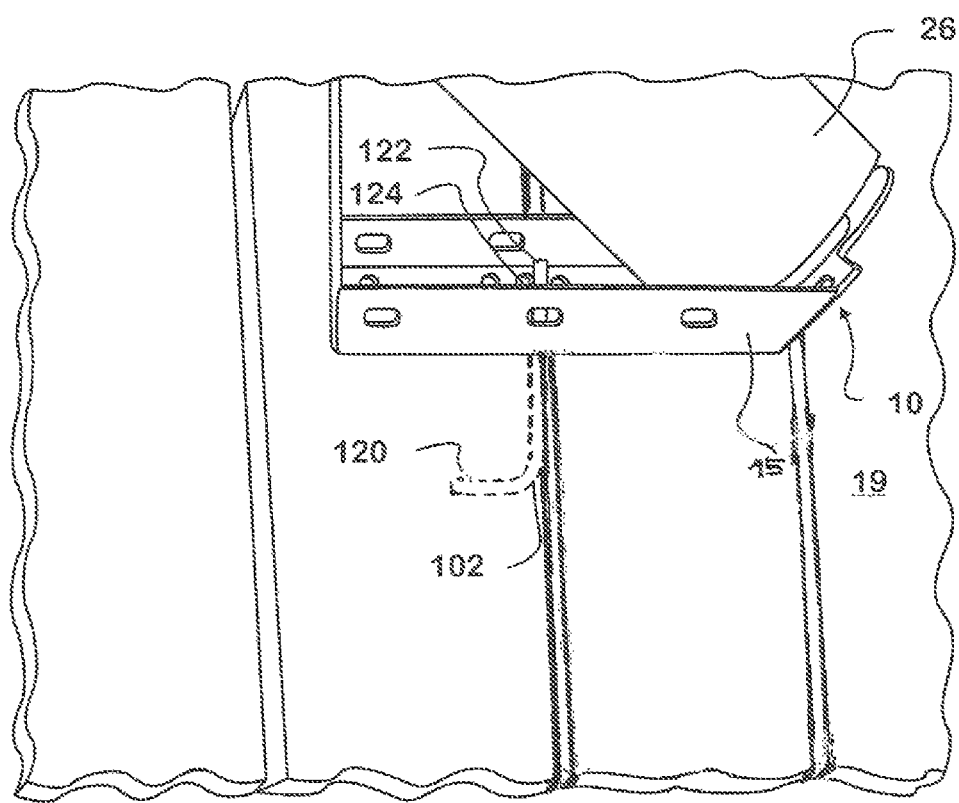
FIG. 7 is a perspective view similar to that of FIG. 6, but shows a threaded bolt which can similarly be used but is formed or bent in the shape of an "L", with the lower end of the threaded rod inserted into the gap between the boards and turned approximately 90 degrees or so to engage the underside of one of the planks. Were a "T"-shaped rod inserted instead, it would have engaged both boards.

In FIG. 7, a similar scenario is seen except that the mounting means here comprise an "L"-shaped bolt 102, which is similarly utilized as is the inverted "T"-shaped bolt 100, except that the base 120 of the "L" is engaged against the underside of a single piece of supporting surface 19. The threaded end 122 of this bolt 102 is also passed through opening 111 in the base 12 and fixed in position through use of a nut 124, preferably a wing nut 124.

Figure 8:
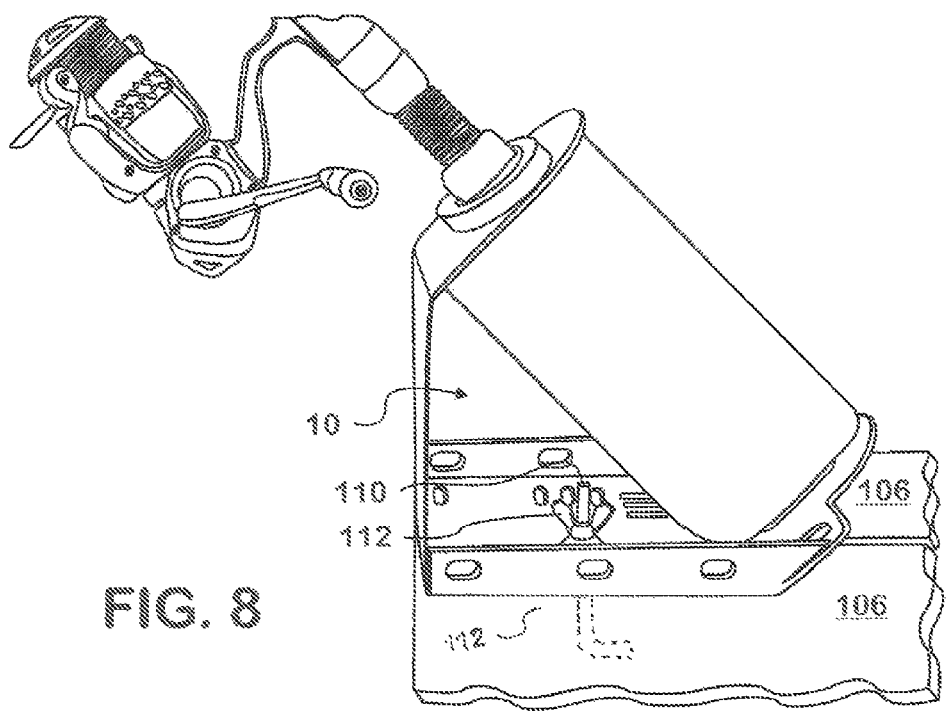
FIG. 8 is a perspective view of the fishing rod holder of FIG. 6 or 7 showing the fishing rod holder attached to a surface comprised of planks or boards with spaces or gaps there between, and the fishing rod holder is shown aligned along a length of the adjacent boards, with the portion of the threaded rod engaging the underside of the boards shown in dotted lines.
Figure 9:
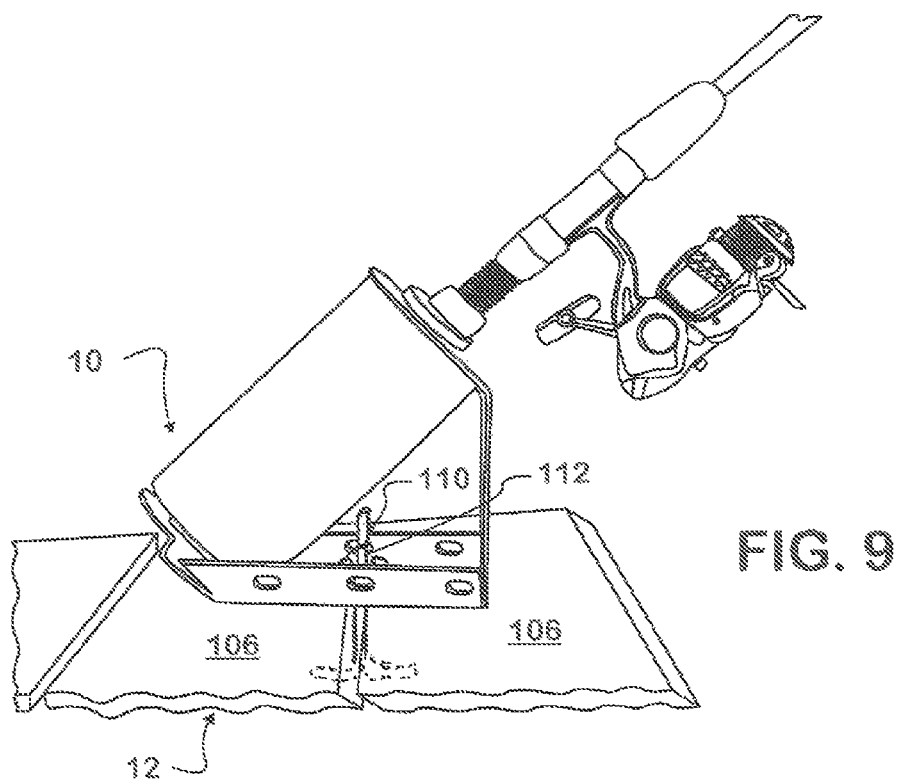
FIG. 9 is a perspective view of the fishing rod holder of FIG. 6 or 7 showing the fishing rod holder attached to a surface comprised of similar planks or boards with spaces or gaps there between, and the fishing rod holder is shown aligned across the width of the adjacent boards, with the portion of the "T"-shaped threaded rod engaging the underside of the boards shown in dotted line.

From a viewing of FIGS. 8 and 9, it will be understood that the base 12 of the fishing rod holder 10 may be oriented along a length of the opening 104, between boards or planks, or may be oriented perpendicular thereto.

Figure 10:
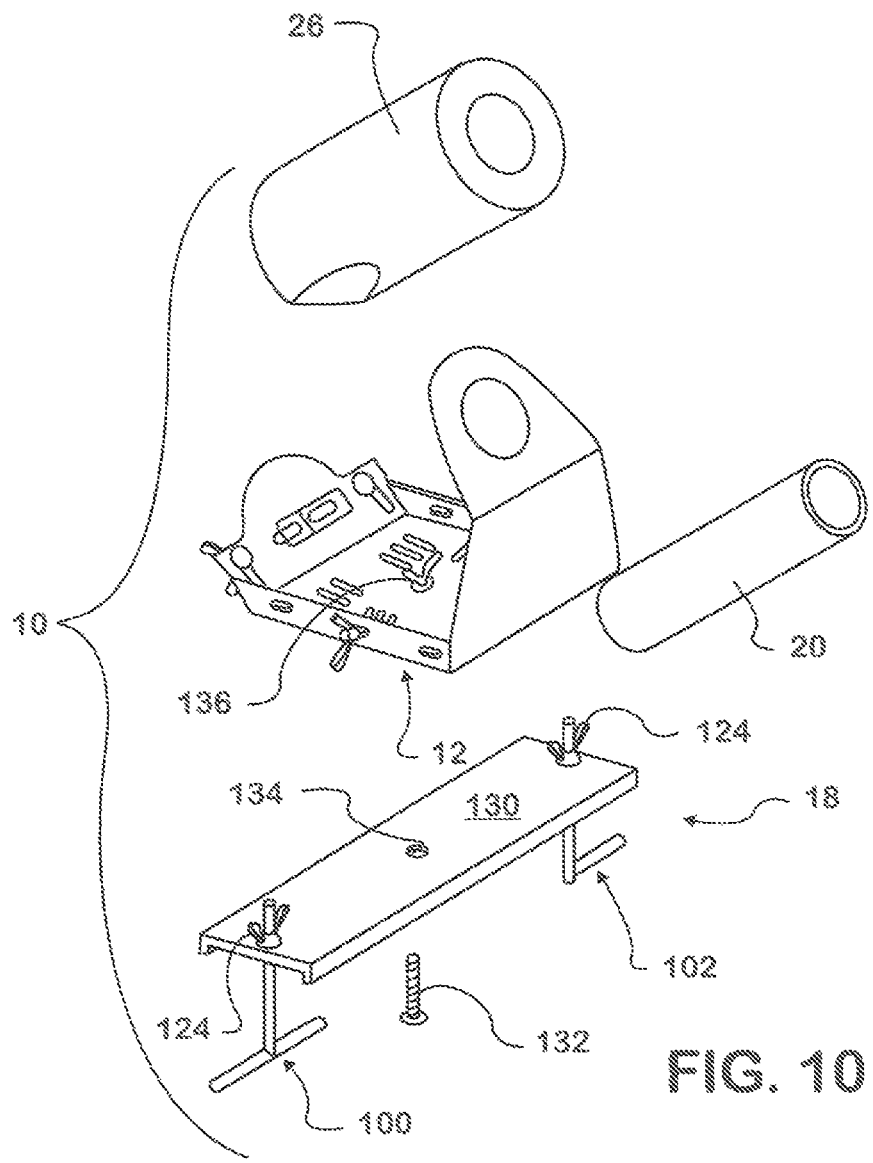
FIG. 10 is an exploded perspective view of an embodiment of the fishing rod holder of the present invention, showing one attachment means which comprises a flat deck plate or cross member which attaches to an underside of the base of the fishing rod holder and utilizes one or more inverted "T"-shaped and/or "L"-shaped bolts or threaded rods and which secures the fishing rod holder to a supporting surface, such as a dock or deck, the planks or boards thereof having slots or gaps there between into which the inverted "T"-shaped and/or "L"-shaped bolt may be extended and turned so as to engage an undersurface of the supporting surface of the boards or planks when tightened there against by means of wing nuts. The deck plate could be more or less left attached to the dock or deck, and the fishing rod holder and base means installed thereon when needed.
Figure 11:
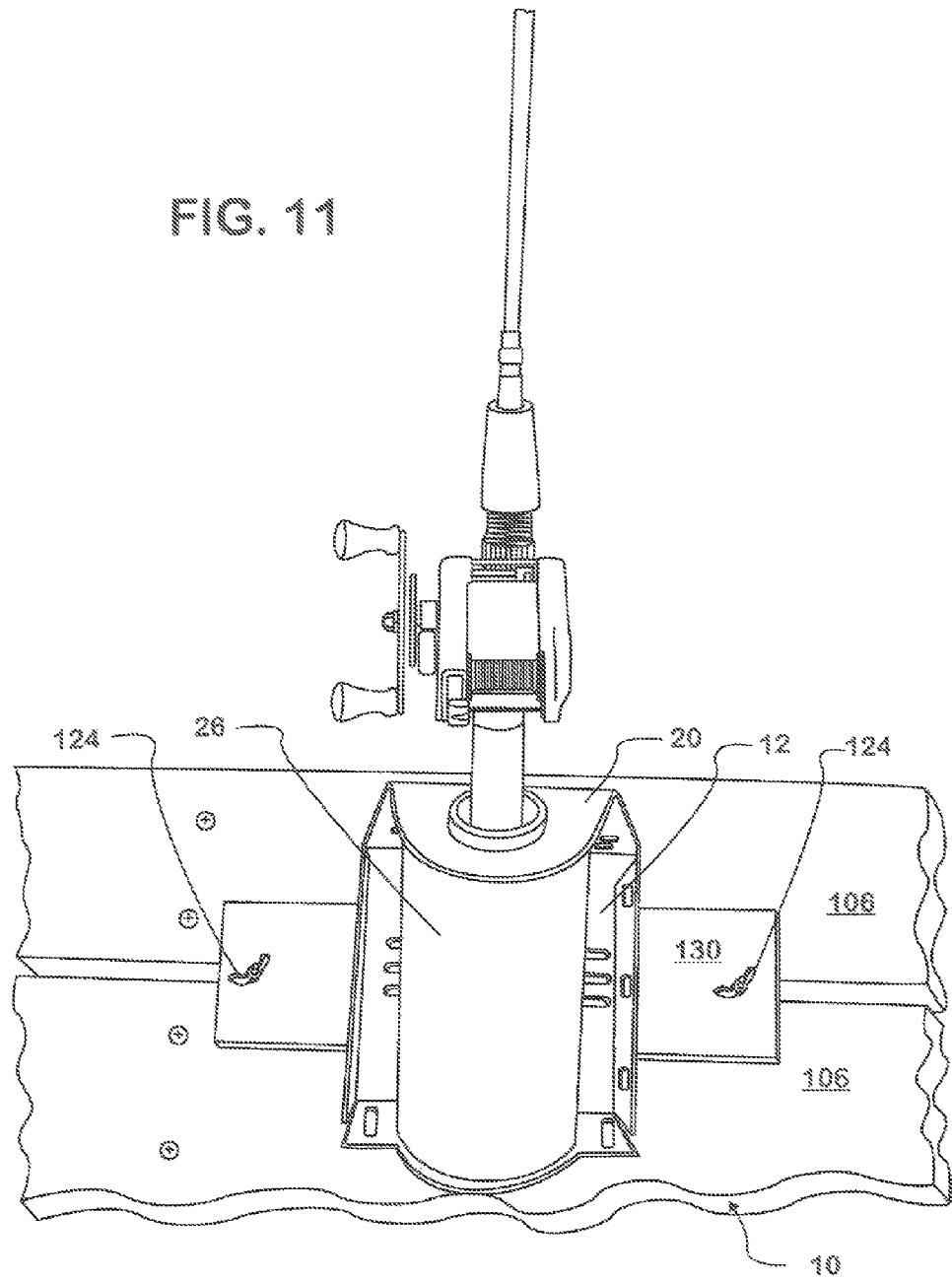
FIG. 11 is a perspective view of the embodiment of the fishing rod holder of FIG. 10 and shows the same in use holding a fishing rod and being attached to a supporting surface (deck or dock planks) with at least one slot (or open edge) therein through (or past) which the lower ends of the bolts of the attachment means extend.

In FIGS. 10 and 11, another alternative mounting means 18 is shown which comprises a deck plate or elongate plate 130 engaged to a base 12 of the fishing rod holder by a bolt 132 extending through a centered opening 134 in the plate 130 and through the opening 111 (not shown) in the base 12 and being fixed in place by a wing nut 136 mounted over a threaded end of the bolt 132. Each end of the elongate plate 130 further includes an end opening 138 through which bolts, such as 100 and/or 102 described above, are received and appropriately engaged by wing nuts 124, as defined above. When positioned correctly, the plate 130 extends along an opening 104 between adjacent boards 106.

Figure 12:
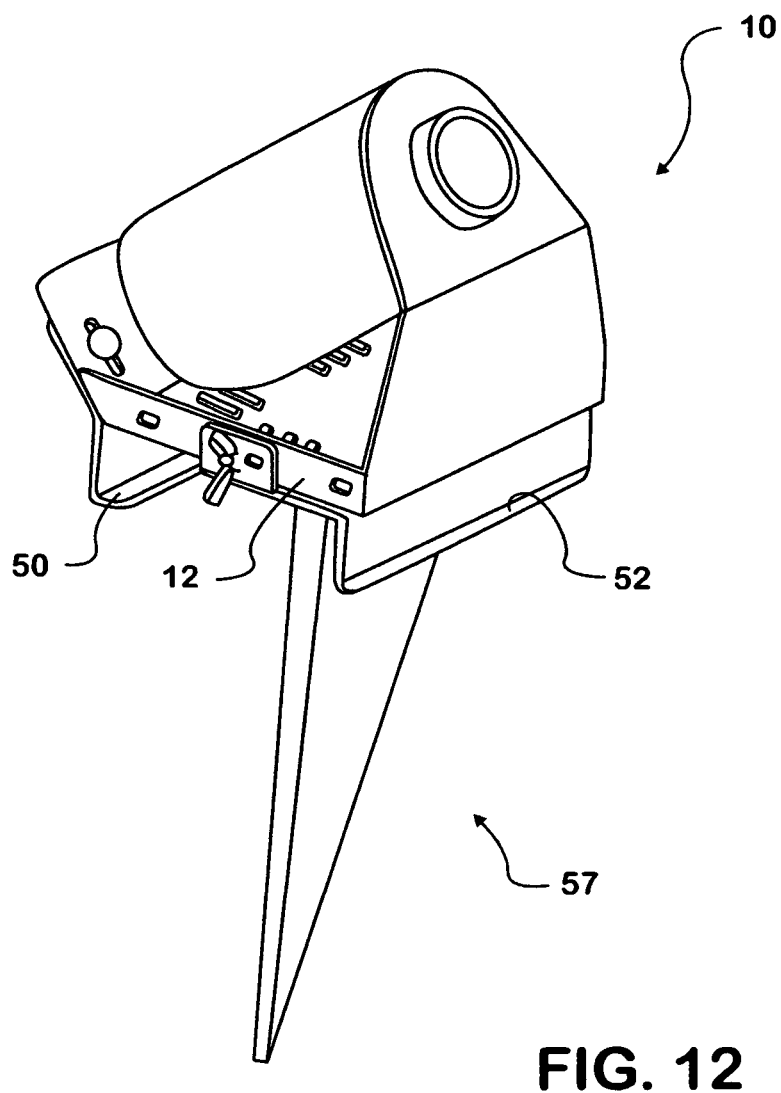
FIG. 12 is a perspective view of an embodiment of the fishing rod holder of FIG. 1 showing another attachment means, comprising a ground stake, made as shown in FIGS. 23 and 24.
Figure 13:
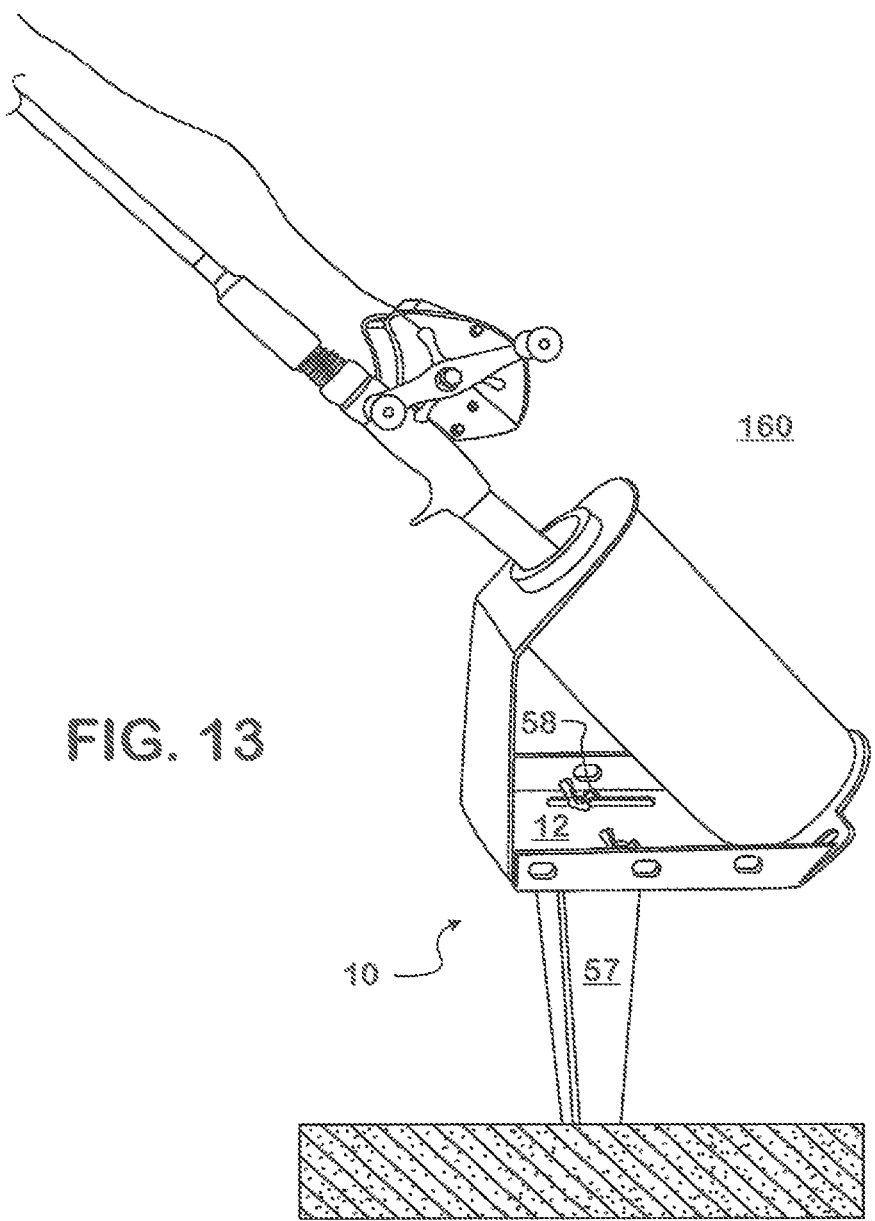
FIG. 13 shows the embodiment of the fishing rod holder illustrated in FIG. 12 in use holding a fishing rod above the ground utilizing and on the ground stake.
Figure 23:
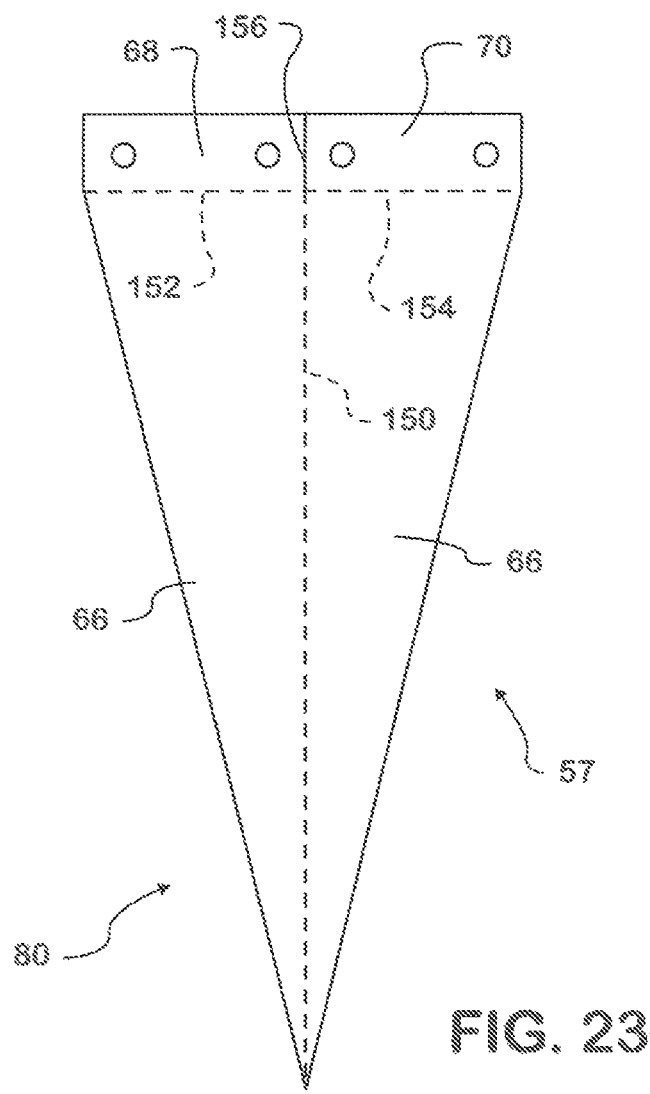
FIG. 23 is a plan view of a blank used to form the ground stake, with folds or bends being made along the dotted lines.
Figure 24:
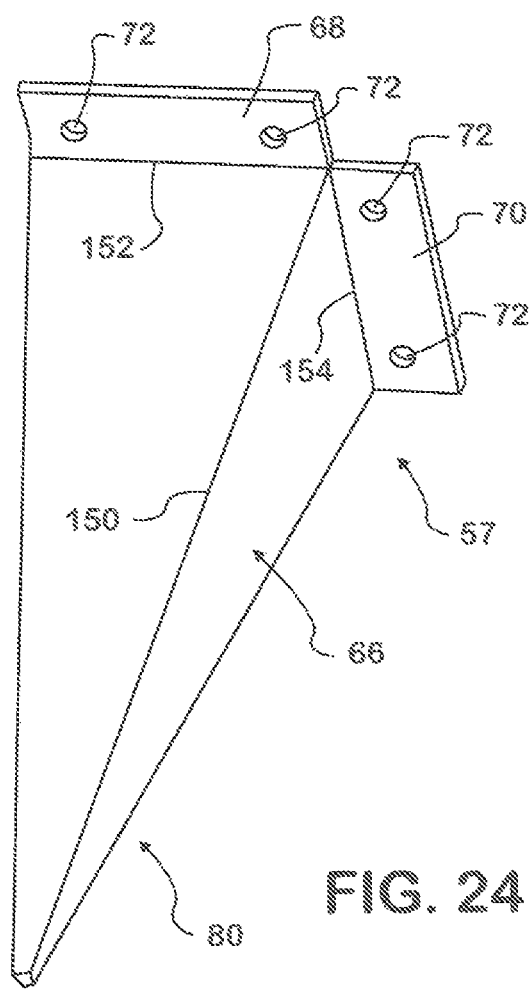
FIG. 24 is a perspective view of the ground stake blank folded or bent along the dotted lines shown in FIG. 23.

As illustrated in FIGS. 12 and 13, the ground stake 57, in a preferred embodiment, is also bent from a suitable material, such as one of the above mentioned metals, and preferably aluminum into an elongate open, two sided elongated pyramidal post or stake section 57, though this should not be construed as limiting. The post or ground stake 57 includes bent top flanges 68 and 70 having openings 72 therein which cooperate with any suitable slotted openings in the base 12 to allow securement of the ground stake 57 to the base 12, by connectors 58 as defined above. The connectors 58 extend through the cooperating openings 72 and the suitable openings (not shown) as defined above, in the base 12. The blank 80 from which the stake 57 is bent is shown unbent in FIG. 23 and then bent along dotted lines 150, 152, and 154 and separated along line 156, to appropriate configuration as shown in FIG. 24. In FIG. 13, the fishing rod holder 10 is shown engaged to ground (including beach sand, etc.) 160 by the ground stake 57 engaged to the base of the fishing rod holder 10.

Figure 14:
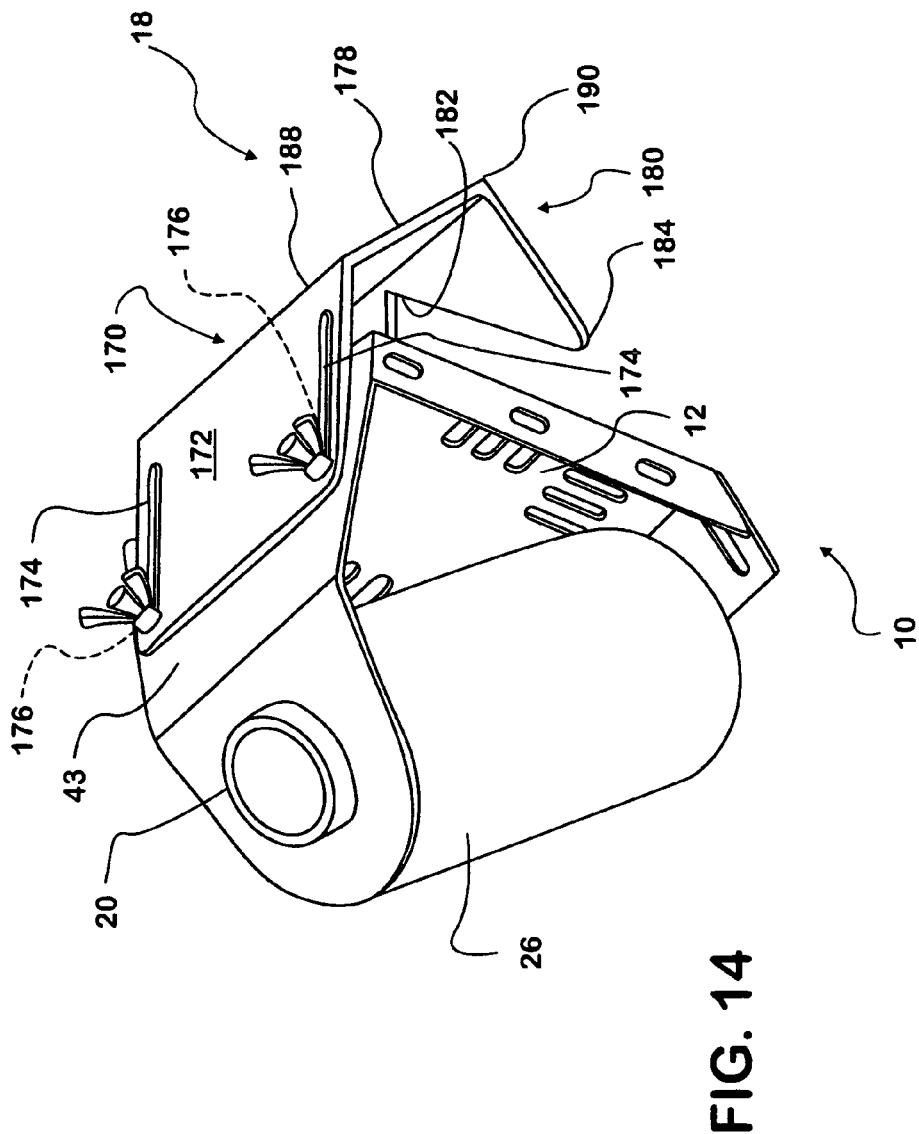
FIG. 14 is a perspective view of an embodiment of the fishing rod holder of the present invention wherein the accessory attachment means comprise a rail bracket including a downwardly disposed flange having a "V"-shaped cutout in a free end thereof, for use in connection with one of the front or rear clamps in attaching the fishing rod holder to an item such as a "T"-shaped connection formed by a jointed cylindrical or tubular rails, posts or piping.
Figure 15:
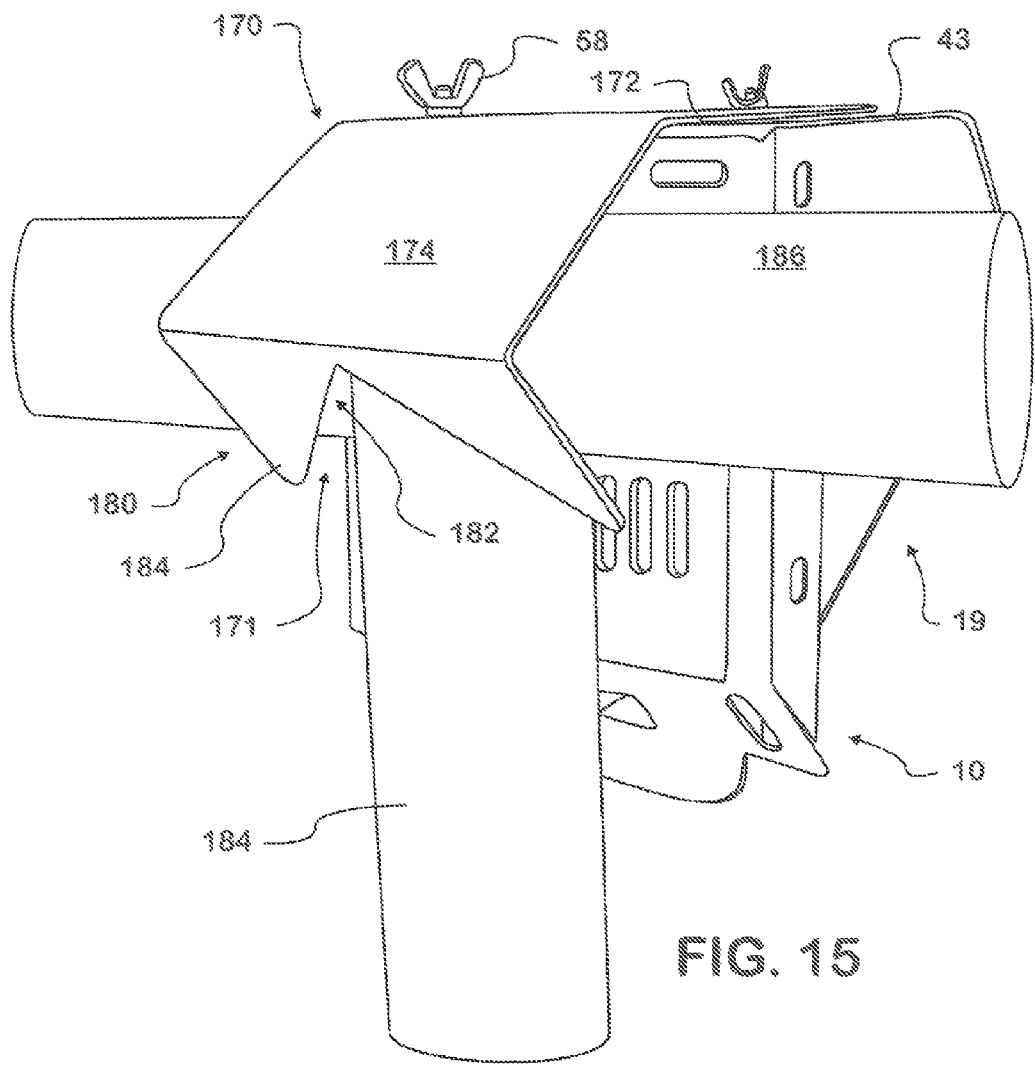
FIG. 15 is a perspective view of the fishing rod holder of FIG. 14 shown attached by the rail bracket or flange to a "T"-shaped joint area of two sections of perpendicularly disposed rail, post or piping, with a vertical section of the post or piping being received within the "V"-shaped cutout at the lower free end thereof.
Figure 16:
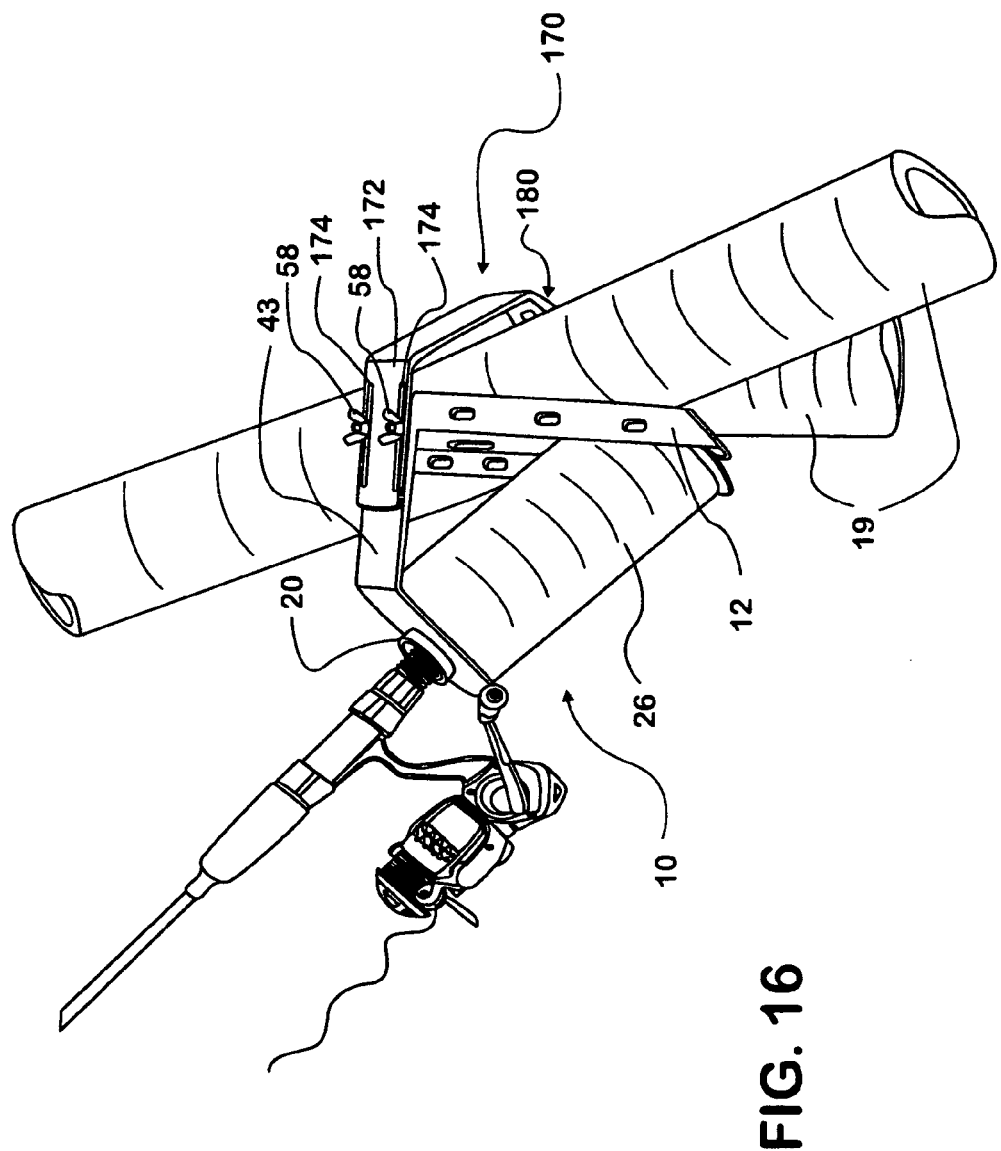
FIG. 16 is a perspective view of the fishing rod holder of FIGS. 14 and 15 shown attaching the holder with fishing rod rail bracket to a horizontal curved rail at a joint with a vertical post member.
Figure 28:
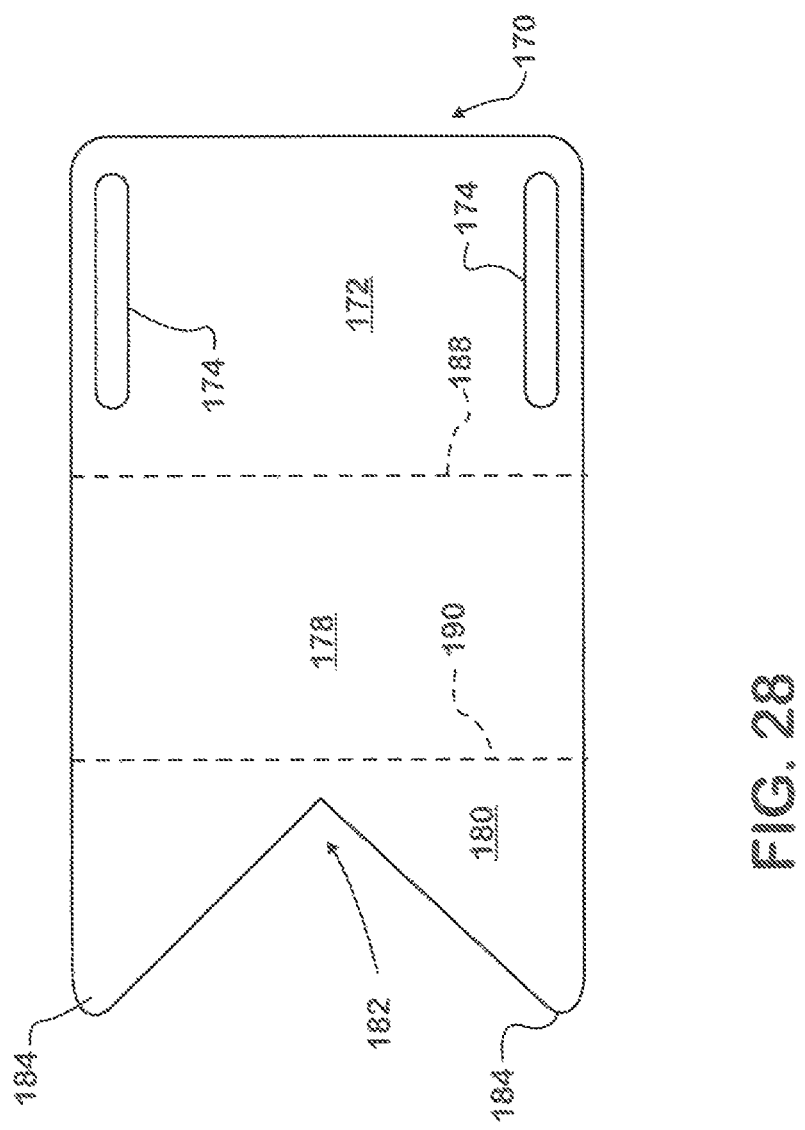
FIG. 28 is a plan view of a blank used to form the rail bracket with downwardly disposed flange having a "V"-shaped cutout in a free end thereof, with folds or bends being made along the dotted lines.

Turning now to FIGS. 14-16, the fishing rod holder 10 is shown to have a further embodiment of mounting means 18 in the form of a rail bracket or singular or rail clamp 170 which accommodates mounting of the fishing rod holder 10 to a support surface 19 (See FIG. 15), such as at a "T"-shaped intersection 171 formed between rail and post, two pipes, or rods 186 and 184. The rail bracket or rail clamp is made from the flat blank shown in FIG. 28, bent along the dotted lines 188 and 190. The rail bracket or singular clamp 170 includes a first section 172 which aligns along second, taller end flange 43 of the fishing rod holder 10. The first section 172 includes a pair of aligned slots 174 which cooperate and align with openings 176 in the second, taller end flange 43. The singular clamp 170 is movably fixed to the second, taller end flange 43 by a connector 58 extending through each slot 174 and cooperating opening 176 in 43 in a manner where the vertical alignment of the singular clamp 170 can be adjusted as desired, relative to the taller end flange 43 to which it is mounted and from which it depends. The rail or singular clamp 170 includes a second portion 178 which is bent to an angularly downwardly position toward the base 12 of the fishing rod holder 10. From a free end of this second portion 178 an upwardly angled end portion 180 extends over the horizontal railing and further toward the base 12 and includes a "V"-shaped cutout 182 in the free end 184 thereof, somewhat under the horizontal railing 186 and may abut a vertical pipe or rail 184 (FIG. 15).

In a first position of the rail singular clamp 170 shown in FIG. 15, the "V"-shaped cutout 182 accommodates an upright portion 184 of the "T"-shaped intersection 171, to either side of the upright portion 184, while the remainder of the upwardly angled end portion 180 and second section 174 carry the first portion 172 to engage the fishing rod holder 10 above the horizontal portion 186 of the "T"-shaped intersection 17. It will be seen here that the base 12 of the fishing rod holder 10 is positioned vertically.

Further, as illustrated in FIG. 16, the rail bracket 170 is also configured to accommodate attachment of the fishing rod holder 10 to a portion of a horizontal, curved, tubular rail and to the vertical support post thereunder, with the "V" cutout extending around the horizontal railing and engaging against the vertical tubular post. When in use in this configuration, the base 12 of the fishing rod holder 10 is seen to be oriented vertically on the support structure 19.

Figure 17:
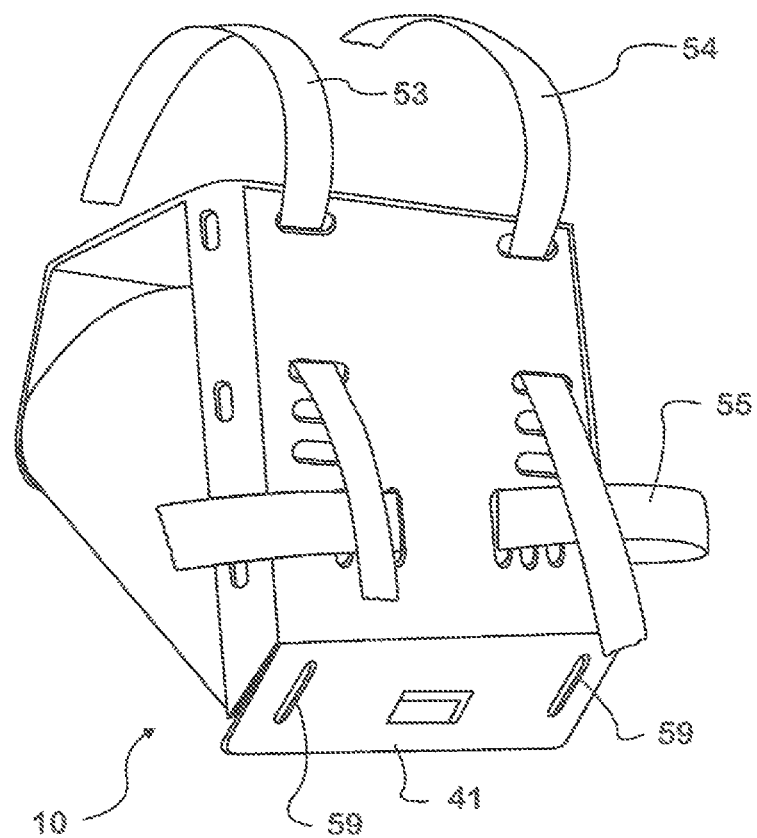
FIG. 17 is a perspective view of an embodiment of the fishing rod holder showing the accessory attachment means to comprise a suitably positioned plurality of straps for use to strap or tie the rod holder to or on a support member.
Figure 18:
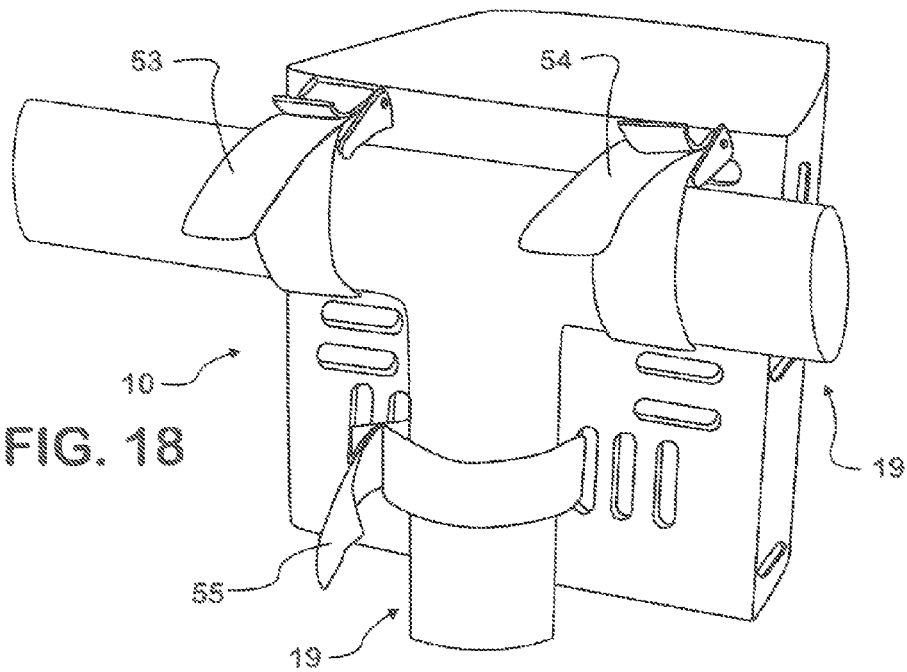
FIG. 18 is a perspective view of the embodiment of FIG. 17 attached by means of straps (buckled or velcro for example) about a "T"-shaped joint formed between vertical and horizontal posts or piping, say, for example, larger than could be accommodated by the rail bracket.
Figure 19:
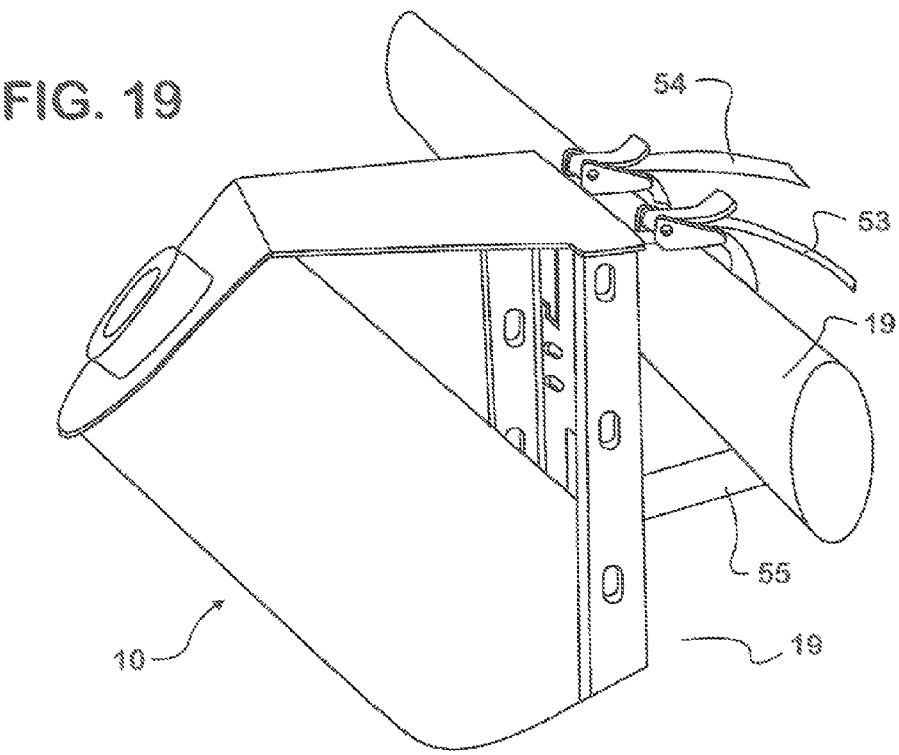
FIG. 19 is a further perspective view of the embodiment of FIG. 17 attached by means of straps about a "T"-shaped joint formed between vertical and horizontal posts or piping.
Figure 20:
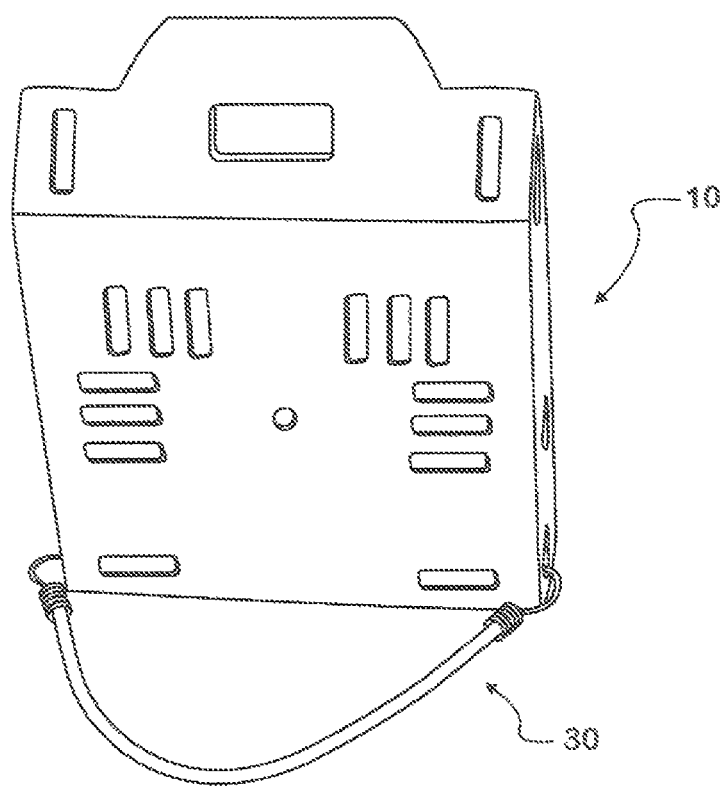
FIG. 20 is a perspective view of an embodiment of the fishing rod holder shown also with attachment means including a safety lanyard or cord, hooked or other ends of which are removably engageable to suitable openings within the base of the fishing rod holder and to accommodate securing to a plurality of supporting surfaces, the cord being preferably stretchable, such as a bungee cord.

Referring to FIG. 17, the fishing rod holder 10 and particularly its base 12 has a plurality of slots to accommodate various positions of straps 53, 54, and 55 for example to attach the fishing rod holder to other suitable structure such as a large post or railing. These straps could be secured to each other by hook/loop fasteners, such as sold under the trademark Velcro, or fitted with buckles or other means adjustably securing the straps. FIG. 17 particularly shows the base 12 vertical to better illustrate the strap slots and could be secured to a vertical post for example or to a railing, the fishing rod holder tube 20 being oriented to capture or hold the rod handle. Of course, the base could be horizontal and also secured with straps. Illustrations are shown in FIGS. 18 and 19. The safety lanyard, FIG. 20 could have both its ends hooked to the fishing rod holder and around a structure, or one end could be hooked to the fishing rod holder and the other end to a structure.

While a preferred embodiments of rod holder and various mounting means have been illustrated and described and the method of making, and using the fishing rod holder have been illustrated and described, other equivalent elements or equivalent steps would fall within the attached claims.

What is claimed is:

1. A floatable, universally mountable fishing rod holder for use near water comprising rod holding means for holding a handle of a fishing rod, mounting means for mounting the fishing rod holder to at least four of: a deck, a dock, a boat, a railing, a post, a board, a plank, any lumber of a 2"×4" to a 2"×8", vertical or horizontal or to ground, floatable means for floating the fishing rod holder in the water, whereby a fishing rod may be mounted and, should the fishing rod holder fall into the water, it floats and can be recovered wherein said floatable means comprises a sleeve configured to fit around said rod holding means.

2. The fishing rod holder as in claim 1, wherein said mounting means is made of one or more of metal, aluminum, steel, stainless steel, galvanized steel, plastic and wood.

3. The fishing rod holder as in claim 1, wherein said mounting means includes one or more of a rail bracket, a clamp, a pair of first and second cooperating clamps, a deck plate, a first strap, a second strap, a third strap, a ground stake, and a safety lanyard or cord.

4. The fishing rod holder as in claim 1, wherein said floatable means is made of one or more of foam, closed cell foam, air chamber, plastic, wood, and other floatable material.

5. The fishing rod holder as in claim 1, wherein at least one portion of said fishing rod holder is magnetically attractable, and can be recovered by another magnetically attractable material.

6. The fishing rod holder as in claim 1, wherein said mounting means includes a body having a base made of a plate material, cut and bent to shape.

7. The fishing rod holder as in claim 6, wherein said base cooperates with said one or more clamps, said clamps being mountable to said base and being formed from plate bent or folded to shape.

8. The fishing rod holder as in claim 1, wherein said rod holding means further comprises a tube.

9. The fishing rod holder as in claim 8, wherein said floatable means comprise a foam sleeve mounted around said tube.

10. The fishing rod holder as in claim 6, wherein the base cooperates with said ground stake, the ground stake being mountable to said base and being formed from plate bent or folded to shape.

11. The fishing rod holder as in claim 6, wherein the base cooperates with said rail bracket, the rail bracket being mountable to said base and adapted to hold said base to a railing, and being formed from plate bent or folded to shape.

12. The fishing rod holder as in claim 6, wherein the base cooperates with said deck plate, said base being mountable to said deck plate and being formed from plate.

13. The fishing rod holder as in claim 6, wherein the base cooperates with at least one nut and bolt combination, the nut and bolt combination being mountable to said base to hold one or more of said rail bracket, clamp, pair of clamps, and a deck plate to said base.

14. The fishing rod holder as in claim 6, wherein the base has a plurality of openings therein to receive and cooperate with a nut and bolt combination, the nut and bolt combination being mountable to said base in various ones of said plurality of openings.

15. The fishing rod holder as in claim 6, wherein the base has a plurality of strap slots therein and cooperates with at least one of said straps, the strap being mountable to said base by passing through said strap slots.

16. The fishing rod holder as in claim 6, including a safety lanyard, the fishing rod holder cooperating with said safety lanyard, the safety lanyard being mountable to hold said fishing rod holder from falling into the water.

17. The fishing rod holder as in claim 6, wherein said base comprises a bottom member, and front and rear members extending from said bottom member, said front and rear members supporting said rod holding means.

18. The fishing rod holder as in claim 17, wherein said rod holder means comprises a tube and said tube fits into one of said front and rear members and is secured to the other of said front and rear members.

19. The fishing rod holder as in claim 18, wherein said rear member has an opening to receive said tube, said tube being secured to said front member.

20. The fishing rod holder as in claim 19, wherein said front and rear clamps of said mounting means are removable adjustable on said base.

21. The fishing rod holder as in claim 18, wherein said floatable means comprises a foam wrapped around said tube.

22. The fishing rod holder as in claim 18, wherein said base has tabs bent to secure said tube.

23. The fishing rod holder as in claim 17, further including a rod which is adapted to secure the base to said deck, dock and lumber by engaging the underside of the same.

24. The fishing rod holder as in claim 23, wherein said rod is threaded at one end and formed into one of an "L" or "T"-shape at the other end.

25. The fishing rod holder as in claim 17, wherein said deck plate is removably securable to the base, said deck plate having one or more threaded rods to removably secure the deck plate onto a dock or deck by engaging the underside of the dock or deck.

26. The fishing rod holder as in claim 25, wherein said dock or deck comprises spaced apart planks, said threaded rod being passable between said planks to secure the fishing rod holder generally parallel or perpendicular to said planks.

27. The fishing rod holder as in claim 1, further including a ground stake and a base, said stake being removably mountable to said base.

28. The fishing rod holder as in claim 27, wherein said ground stake is pointed at one end and has its other end being removably mountable to said base.

29. The fishing rod holder as in claim 1, further including a rail bracket and a base, said rail bracket removably securable to said base, said rail bracket having one end adapted to engage a vertical support for a rail.

30. The fishing rod holder as in claim 29, wherein said one end of said rail bracket is "V"-shaped and adapted to abut the vertical support.

31. The fishing rod holder as in claim 1, further including a said strap is one of fastened by hook and loop or a buckle fasteners on said strap.

32. The fishing rod holder as in claim 6, wherein one or more of said base, ground stake, front clamp, and rear clamp is formed from flat material and bent to shape.

33. The fishing rod holder as in claim 32, said rail bracket being formed of flat material and bent to shape.

34. The fishing rod holder as in claim 2, wherein said mounting means includes one or more of a rail bracket, clamp, a pair of first and second cooperating clamps, a deck plate, at least a one strap, a ground stake, and a safety lanyard or cord, said floatable means being made of foam, said fishing rod holder including a body having a base made of a plate material, cut and bent to shape, said base cooperating with said one or more clamps, said clamps being mountable to said base and being formed from plate bent or folded to shape, said rod holding means including a tube carried by said body, said foam being in the form of a sleeve wrapped around said tube, the base cooperating with said ground stake, the ground stake being removably mountable to said base and being formed from plate bent or folded to shape, the base cooperating with said rail bracket, the rail bracket being mountable to said base and adapted to hold said base to a rail, and being formed from plate bent or folded to shape, the base cooperating with a deck plate, said deck plate being mountable to said base and being formed from plate, the base cooperating with at least one nut and bolt combination, the nut and bolt combination being mountable to said base to hold one or more of said rail bracket, pair of clamps, and a deck plate to said base, the base having a plurality of strap slots therein and cooperates with said at least one strap, fitting into said strap slots, said strap being one of fastened by hook and loop fasteners or a buckle, said base having a bottom member and front and rear members extending from said bottom member, said front and rear members supporting said rod holding means, said rod holding means being a tube fitting into said rear member and is secured to the front member, said rear member having an opening to receive said tube, said front and rear clamps of said mounting means being removably adjustable on said base, said base having tabs bent to secure said tube, further including a threaded rod which is adapted to secure the base to said deck, dock and lumber by engaging the underside of the same, said rod being threaded at one end and formed or made into one of an "L" or a "T"-shape at the other end, said deck plate having one or more of said threaded rods to removably secure the deck plate onto a dock or deck by engaging the underside of the dock or deck, said ground stake being pointed at one end and has its other end removably mountable to said base, said rail bracket being removably securable to said base and having one end adapted to engage a railing, said rail bracket being formed of flat material and bent to shape, said one end of said rail bracket being "V"-shaped.

35. A method for making a fishing rod holder comprising the steps of:
cutting a tube adapted to fit and retain a fishing rod and its handle,
wrapping the tube in a sleeve comprising floatable material,
stamping out a body from a blank and bending the blank into a base and front and rear extensions,
forming an opening in said rear extensions to receive said tube,
passing one end of the tube through the opening in said rear extension, securing the lower of the tube to said front extension, and
forming one or more clamps from a blank to secure to said base to hold the same to a structure.

36. The method as in claim 35, comprising the further steps of:
forming at least one thread rod with one end threaded and an "L" or "T"-shape on the other end for securing the base to one or more planks and against the underside of the same.

37. The method as in claim 35, comprising the steps of:
forming a ground stake from a blank, and
bending the ground stake to shape, and
forming a portion of the ground stake to secure to said base.

38. The method as in claim 34, comprising the steps of:
forming a rail bracket from a blank,
forming a "V" at one end of said rail bracket adapted for engaging a railing or round tube, and
forming a provision for adjustably removably attaching said rail bracket to said base.

39. The method as in claim 35, comprising the steps of:
forming a plurality of strap slots in said base, and
providing one or more straps to be received in said strap slots to secure the base to a structure.

40. The method as in claim 36, comprising the further steps of:
forming a ground stake from a blank and bending the ground stake to shape,
forming a portion of the ground stake to secure to said base,
forming a rail bracket from a blank, forming a "V" at one end of said rail bracket adapted for engaging a railing or round tube,
forming a provision for adjustably removably attaching said rail bracket to said base,
forming a plurality of strap slots in said base, and
providing one or more straps to be received in said strap slots to secure the base to a structure.

41. A method of using a fishing rod holder having a body with a base and front and rear extensions therefrom, a rod holder tube secured to said front and rear extensions, floatable material for floating the fishing rod holder, a front clamps, a rear clamp, slots in said fishing rod holder and one or more straps, a rail bracket, a deck plate removably attachable to said base, one or more threaded "L" or "T"-shaped rods attachable to said base or deck plate, and a ground stake, comprising the steps of: selecting the base with rod holder and floatable material thereon and one of the following steps:
(a) removably installing and attaching the fishing rod holder to a structure using the front and rear clamp;
(b) removably installing and attaching the fishing rod holder to a structure using slots and one or more straps;
(c) removably installing and attaching the fishing rod holder to a structure using the rail bracket and one of the front and rear clamps;
(d) removably installing and attaching the deck plate on a structure using one or more of the "L" or "T"-shaped threaded rods, and removably installing and attaching the base onto the deck plates;
(e) removably installing and attaching the base to a structure using at least one of the "L" or "T"-shaped threaded rods;
(f) removably installing and attaching the base to the ground stake, inserting the ground stake into the ground, and
after completing one of steps (a) through (f), inserting the fishing rod into the fishing rod holder.

42. The method of claim 41, comprising the further steps of:
reversing the above selected step of (a) to (f);
(g) moving to a different location than that for the above selected step of (a) to (f) above; and
(h) reselecting one of the steps of (a) through (f) for use at the different location.

43. The method of claim 41 or 42, comprising the steps of:
(i) removing the fishing rod from the rod holder, and
(j) reversing the step of (a) to (f).

* * * * *